United States Patent
Anderson

(10) Patent No.: US 10,633,900 B2
(45) Date of Patent: Apr. 28, 2020

(54) VEHICLE INTERIOR COMPONENT

(71) Applicant: Shanghai Yanfeng Jinqiao Automotive Trim Systems Co. Ltd., Novi, MI (US)

(72) Inventor: Rick Alan Anderson, Grand Haven, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 66 days.

(21) Appl. No.: 16/150,564

(22) Filed: Oct. 3, 2018

(65) Prior Publication Data

US 2019/0032386 A1    Jan. 31, 2019

Related U.S. Application Data

(63) Continuation-in-part of application No. PCT/US2017/025865, filed on Apr. 4, 2017.

(Continued)

(51) Int. Cl.
  *E05F 1/16*    (2006.01)
  *B60R 7/06*    (2006.01)
  (Continued)

(52) U.S. Cl.
  CPC ............... *E05F 1/16* (2013.01); *B60K 37/00* (2013.01); *B60R 7/04* (2013.01); *B60R 7/06* (2013.01);
  (Continued)

(58) Field of Classification Search
  CPC .. E05F 1/16; E05F 5/003; E05F 11/42; B60K 37/00; B60R 7/04; B60R 7/06;
  (Continued)

(56) References Cited

U.S. PATENT DOCUMENTS 4,893,522 A    1/1990    Arakawa
9,199,579 B2    12/2015    Gillis et al.
(Continued)

FOREIGN PATENT DOCUMENTS

FR    2851966 A1    9/2004
FR    3000927 A1    7/2014
(Continued)

OTHER PUBLICATIONS

Extended European Search Report from the European Patent Office for EP Patent Application No. 17779626.5 dated Sep. 11, 2019 (in English) (20 Pages).

(Continued)

*Primary Examiner* — Lori L Lyjak

(57) ABSTRACT

A vehicle interior component is disclosed. The component may comprise a base and a door moveable along a track between open and closed positions. The door may move in a direction transverse to the track between offset and biased/centered positions. The door may comprise a spring to bias the door toward the biased position. The spring may move first and second arms of the door against the base to prevent door rotation. The door may move along a biased path and first and second offset paths parallel to the biased path. The component may comprise a mechanism configured to move the door from the open position to the closed position along the offset paths and the biased path. The component may comprise at least one of a console, a floor console, a center console, an instrument panel, a door, a cockpit, a storage compartment.

20 Claims, 14 Drawing Sheets

Related U.S. Application Data

(60) Provisional application No. 62/318,576, filed on Apr. 5, 2016.

(51) Int. Cl.
*B60R 7/04* (2006.01)
*B60K 37/00* (2006.01)
*E05F 5/00* (2017.01)
*E05F 11/42* (2006.01)

(52) U.S. Cl.
CPC .............. *E05F 5/003* (2013.01); *E05F 11/42* (2013.01); *E05Y 2201/41* (2013.01); *E05Y 2201/716* (2013.01); *E05Y 2600/13* (2013.01); *E05Y 2900/538* (2013.01)

(58) Field of Classification Search
CPC ........... E05Y 2201/41; E05Y 2201/716; E05Y 2600/13; E05Y 2900/538
See application file for complete search history.

(56) References Cited

U.S. PATENT DOCUMENTS

| 9,796,314 | B2* | 10/2017 | Neumann | B60N 3/102 |
| 2003/0155786 | A1* | 8/2003 | Kim | B60R 7/04 |
| | | | | 296/24.34 |
| 2004/0080173 | A1 | 4/2004 | Niwa et al. | |
| 2004/0118851 | A1 | 6/2004 | Shinomiya | |
| 2015/0240539 | A1 | 8/2015 | Abe | |
| 2016/0304031 | A1* | 10/2016 | Hipshier | B60R 7/04 |
| 2018/0201172 | A1* | 7/2018 | Faruque | B60N 3/002 |

FOREIGN PATENT DOCUMENTS

| JP | 2015098200 A | 5/2015 |
| WO | 2015120034 A1 | 8/2015 |

OTHER PUBLICATIONS

International Search Report and Written Opinion from International Searching Authority for PCT Patent Application No. PCT/US2017/025865 dated Jul. 3, 2017 (in English) (16 pages).

* cited by examiner

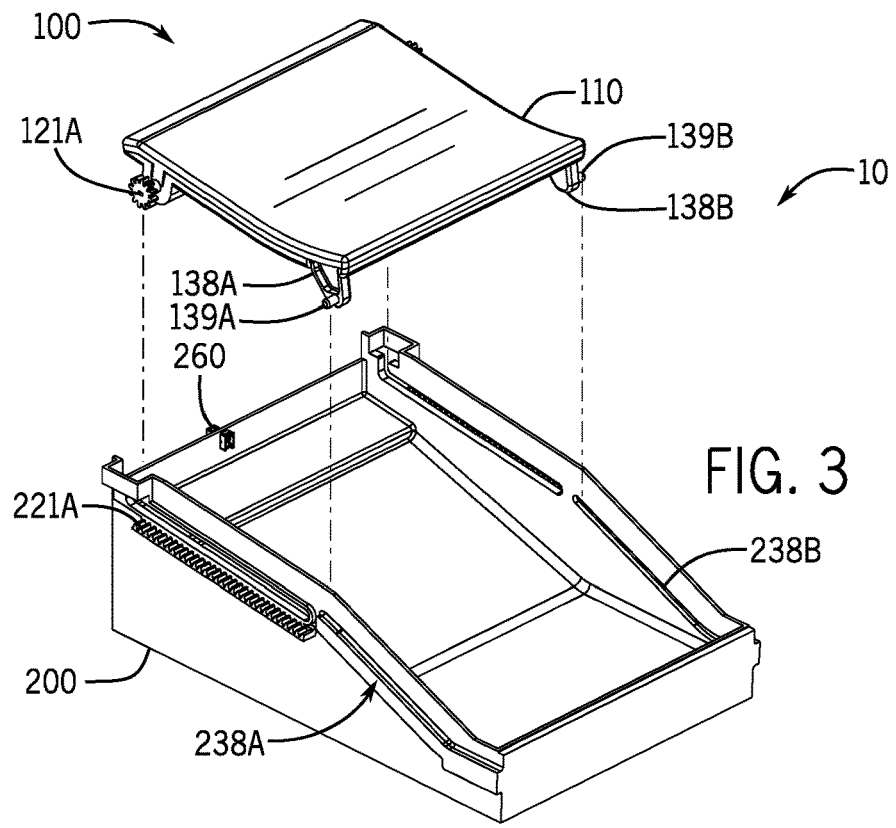
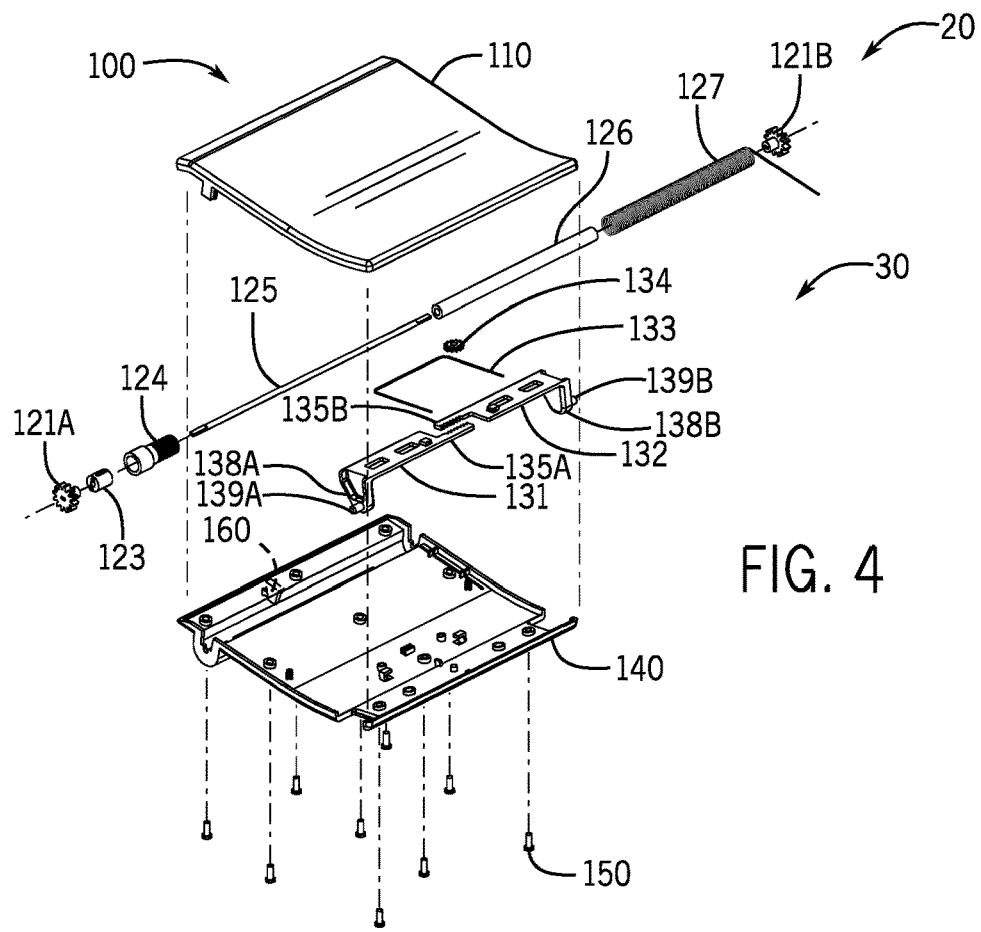

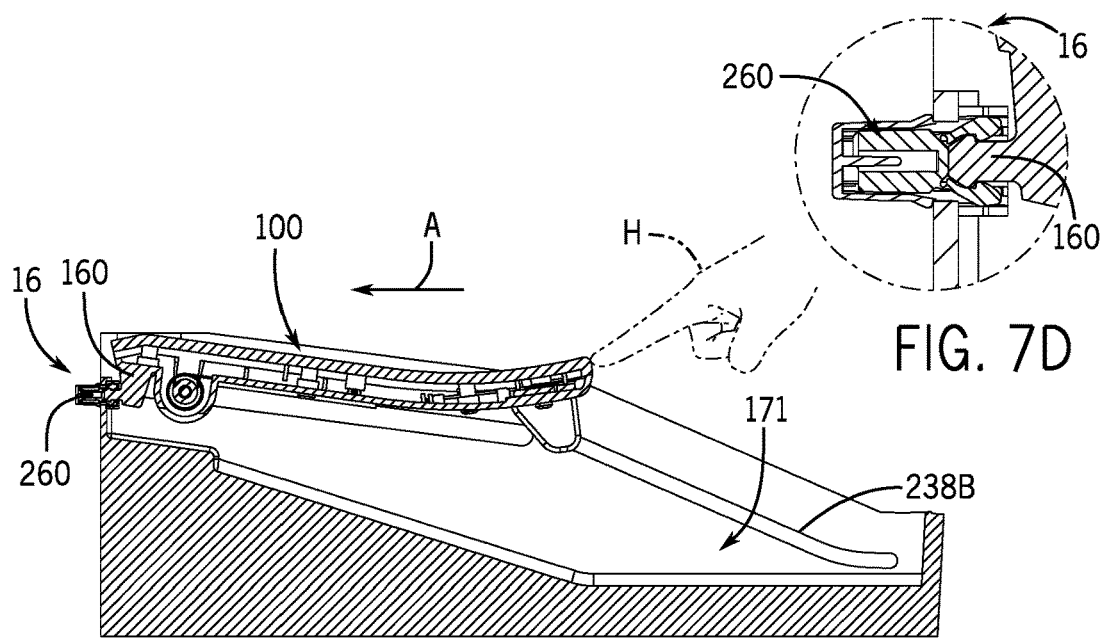
FIG. 7D
FIG. 7A
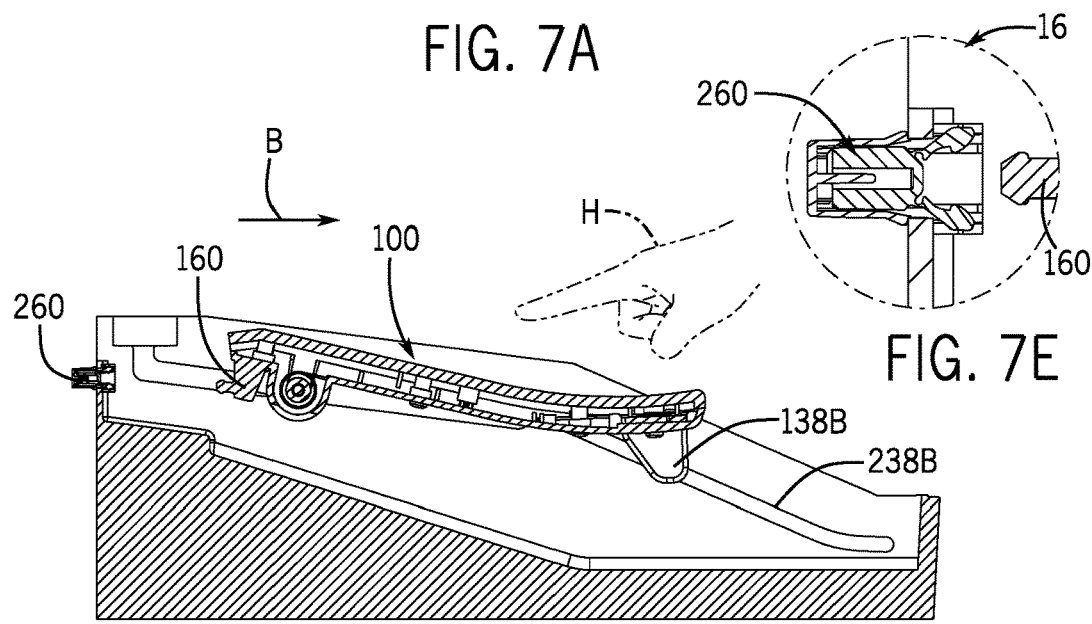
FIG. 7E
FIG. 7B
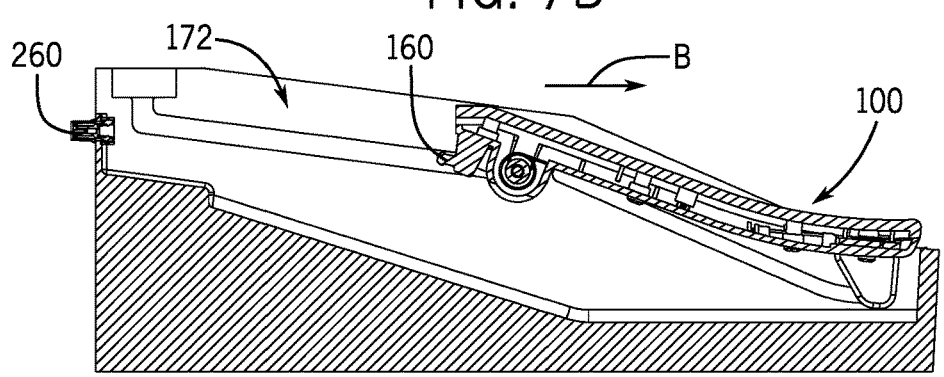
FIG. 7C

VEHICLE INTERIOR COMPONENT

CROSS-REFERENCE TO RELATED APPLICATIONS

The present application is a continuation-in-part of International/PCT Patent Application No. PCT/US2017/025865 titled "STORAGE COMPARTMENT FOR VEHICLE INTERIOR" filed Apr. 4, 2017, which claims the benefit of U.S. Provisional Patent Application No. 62/318,576 titled "STORAGE COMPARTMENT FOR VEHICLE INTERIOR" filed Apr. 5, 2016.

The present application claims priority to and incorporates by reference in full the following patent application(s): (a) U.S. Provisional Patent Application No. 62/318,576 titled "STORAGE COMPARTMENT FOR VEHICLE INTERIOR" filed Apr. 5, 2016; (b) International/PCT Patent Application No. PCT/US2017/025865 titled "STORAGE COMPARTMENT FOR VEHICLE INTERIOR" filed Apr. 4, 2017.

FIELD

The present invention relates to a vehicle interior component. The present invention also relates to a storage compartment for a vehicle interior.

BACKGROUND

It is known in motor vehicles to provide storage compartments for the vehicle interior. It is also known to provide a storage compartment in or adjacent to a floor console or instrument panel. It is further known to provide a movable door to cover and expose one or more openings in the storage compartments. A door that is large may require a guide for door travel so as to prevent side to side movement of the door and to correct for a loose uneven feel.

It would be advantageous to provide an improved storage compartment for a vehicle interior with a door intended to provide a smooth and straight motion for the door with a more even and smooth feel.

SUMMARY

The present invention relates to a component for a vehicle interior comprising a base comprising an opening, a track and a door configured (a) to move along the track from an open position to a closed position to cover the opening of the base and (b) to move from the closed position to the open position. The door may be configured to move in a direction transverse to the track from an offset position toward a biased position. The door may comprise a spring configured to bias the door toward the biased position. The door may comprise a spring, a first arm and a second arm; the spring may be configured to move the first arm and the second arm against the base to prevent rotation of the door relative to the base and center the door between walls of the base. The door may comprise a gear configured to couple the first arm and the second arm; the first arm may comprise a first rack and the second arm may comprise a second rack; the first rack and the second rack may be configured to engage the gear. The track may comprise a first track and a second track; the first arm may be configured to slide along the first track and the second arm may be configured to slide along the second track to guide movement of the door relative to the base. The spring may be configured to provide a force to at least one of: the first arm to move the door from the offset position toward the biased position; the second arm to move the door from the offset position toward the biased position. The component may comprise a mechanism configured to move the door from the open position to the closed position; the mechanism may comprise at least one gear and the base may comprise at least one rack; the at least one gear may be configured to rotate along the at least one rack to move the door relative to the base; the at least one gear may be configured to slide along the at least one rack as the door moves between the offset position and the biased position.

The present invention relates to a component for a vehicle interior comprising a base comprising an opening, a track and a door configured (a) to move along the track from an open position to a closed position to cover the opening of the base and (b) to move from the closed position to the open position. The door may comprise a spring configured to bias the door from a first offset position toward a centered position and from a second offset position toward the centered position. The door may be configured to move in a direction transverse to the track from the first offset position toward the centered position. The door may comprise a first arm and a second arm; the spring may be configured to move the first arm and the second arm against the base to prevent rotation of the door relative to the base and center the door between walls of the base. When the door moves from the centered position toward the first offset position, one of the first arm and the second arm may be configured to move relative to the base and the other of the first arm and the second arm may be configured to maintain a position relative to the base. The door may comprise a gear configured to couple the first arm and the second arm; the first arm may comprise a first rack and the second arm may comprise a second rack; the first rack and the second rack may be configured to engage the gear. The track may comprise a first track and a second track; the first arm may be configured to slide along the first track to guide movement of the door relative to the base and the second arm may be configured to slide along the second track to guide movement of the door relative to the base. The spring may be configured to provide a force to at least one of the first arm; the second arm to move the door from the first offset position toward the centered position. The component may comprise a mechanism configured to move the door from the open position to the closed position; the mechanism may comprise at least one gear and the base may comprise at least one rack, the at least one gear may be configured to rotate along the at least one rack to move the door relative to the base; the at least one gear may be configured to slide along the at least one rack as the door moves between the first offset position, the biased position and the second offset position.

The present invention relates to a component for a vehicle interior comprising a base comprising an opening, a track and a door configured (a) to move along the track from an open position to a closed position to cover the opening of the base and (b) to move from the closed position to the open position. The door may be configured to move in the closing direction (a) along a first offset path, (b) along a biased path, (c) along a second offset path. The first offset path may be generally parallel to the biased path. The component may comprise a mechanism configured to move the door from the open position to the closed position along the first offset path, along the biased path and along the second offset path. The biased path may comprise a centered path; the door may be moved toward the centered path by a spring. The component may comprise at least one of (a) a console; (b) a floor console; (c) a center console; (d) an instrument panel; (e) a door; (f) a cockpit; (g) a storage compartment.

The present invention relates to a console for a vehicle interior. The console may comprise a base comprising an opening; and a door configured to cover the opening of the base and to (a) move from an open position to a closed position and (b) move from the closed position to the open position. The door may be configured to prevent rotation of the door relative to the base. The door may comprise a set of opposed walls; the door may be configured to center itself between the walls of the base. The door may comprise a spring, a first arm and a second arm; the spring may force the first arm and the second arm against the base to prevent rotation of the door relative to the base and center the door between walls of the base. The door may comprise a gear configured to couple the first arm and the second arm. The first arm may comprise a first rack and the second arm may comprise a second rack; the first rack and the second rack may be configured to engage the gear. The door may comprise a substrate and a cover. The first arm, the second arm and the spring may be coupled to the substrate; the cover may be configured to cover the spring and the gear. The first arm and the second arm may extend from the cover and the substrate to contact the base. The base may comprise a first track and a second track; the first arm may be configured to slide along the first track and the second arm may be configured to slide along the second track to guide movement of the door relative to the base. The console may comprise a mechanism configured to move the door from the open position to the closed position. The mechanism may be configured to resist movement of the door from the closed position to the open position. The mechanism may be configured to prevent rotation of the door relative to the base. The mechanism may comprise at least one gear and the base may comprise at least one rack; the at least one gear may be configured to rotate along the at least one rack to move the door relative to the base. The mechanism may comprise a spring and a shaft; the spring may be coupled to the shaft; the shaft may be coupled to the at least one gear. The spring may be configured to provide torque to the shaft to rotate the at least one gear along the at least one rack to move the door relative to the base. The spring may comprise a torsion spring. The at least one rack may be molded in the base. The console may comprise a latch configured to (a) prevent movement of the door from the open position to the closed position and (b) release the door from the base to allow movement of the door from the open position to the closed position. The console may comprise a damper configured to resist movement of the door from the open position to the closed position; movement of the door may comprise sliding. The door may be free to move from the closed position to the open position without actuation of at least one of (a) a latching device, (b) a handle, (c) a locking device.

The present invention also relates to a console for a vehicle interior. The console may comprise a base comprising an opening; a door configured to move relative to the base from an open position to a closed position; and a mechanism configured to move the door from the open position to the closed position. The door may be configured to cover the opening of the base in the closed position; the door may comprise the mechanism. The mechanism may be configured to (a) resist movement of the door from the closed position to the open position and (b) prevent rotation of the door relative to the base. The mechanism may comprise at least one gear and the base comprises at least one rack; the at least one gear may be configured to rotate along the at least one rack to move the door relative to the base. The mechanism may comprise a spring and a shaft; the spring may be coupled to the shaft; the shaft may be coupled to the at least one gear; the spring may be configured to provide torque to the shaft to rotate the at least one gear along the at least one rack to move the door relative to the base. The base may comprise a latch configured to provide a force to overcome torque provided by the spring to prevent movement of the door from the open position to the closed position. The console may comprise a damper coupled to the shaft configured to resist movement of the door from the open position to the closed position.

The present invention further relates to a console for a vehicle interior. The console may comprise a base; and a cover coupled to the base configured to move relative to the base (a) from a first position to a second position and (b) from the second position to the first position. The cover may comprise a drive mechanism configured to move the cover from the first position to the second position; the cover may comprise a centering mechanism configured to prevent rotation of the cover relative to the base. The drive mechanism may comprise a torsion spring and a damper coupled to a shaft; the shaft may comprise at least one wheel configured move the cover relative to the base. The centering mechanism may comprise a spring and a first arm coupled to a second arm; the spring may provide force to the first arm and the second arm to prevent rotation of the door relative to the base and center the door between walls of the base.

FIGURES

FIG. 3 is a schematic exploded view of a storage compartment according to an exemplary embodiment.

FIG. 4 is a schematic exploded view of a door of the storage compartment according to an exemplary embodiment.

FIGS. 7A to 7C are schematic cross-section views of a storage compartment according to an exemplary embodiment.

FIGS. 7D and 7E are schematic detail views of a latch mechanism for a storage compartment according to an exemplary embodiment.

DESCRIPTION

Figure 1A:
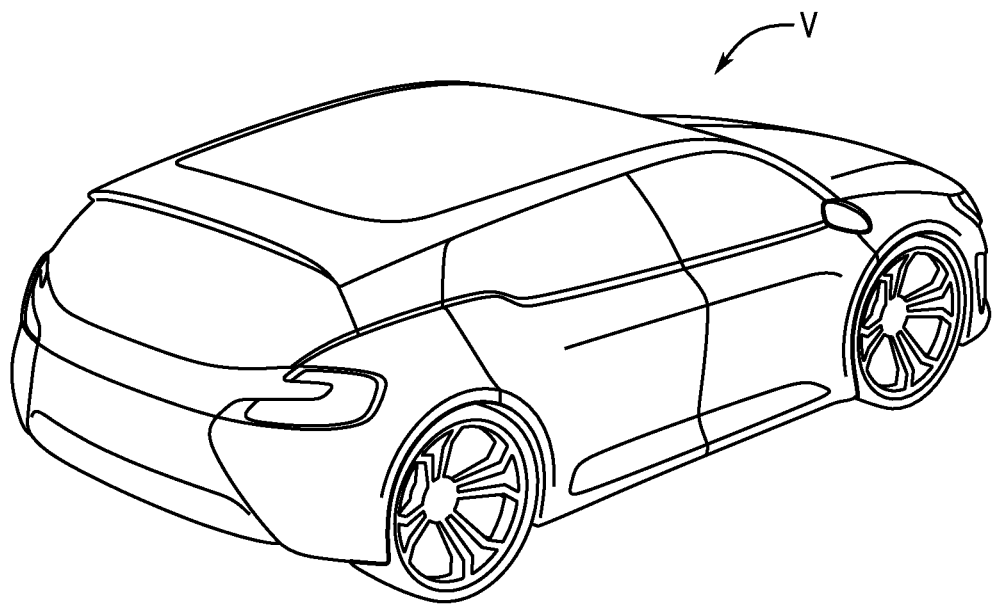
FIG. 1A is a schematic perspective view of a vehicle according to an exemplary embodiment.
Figure 1B:
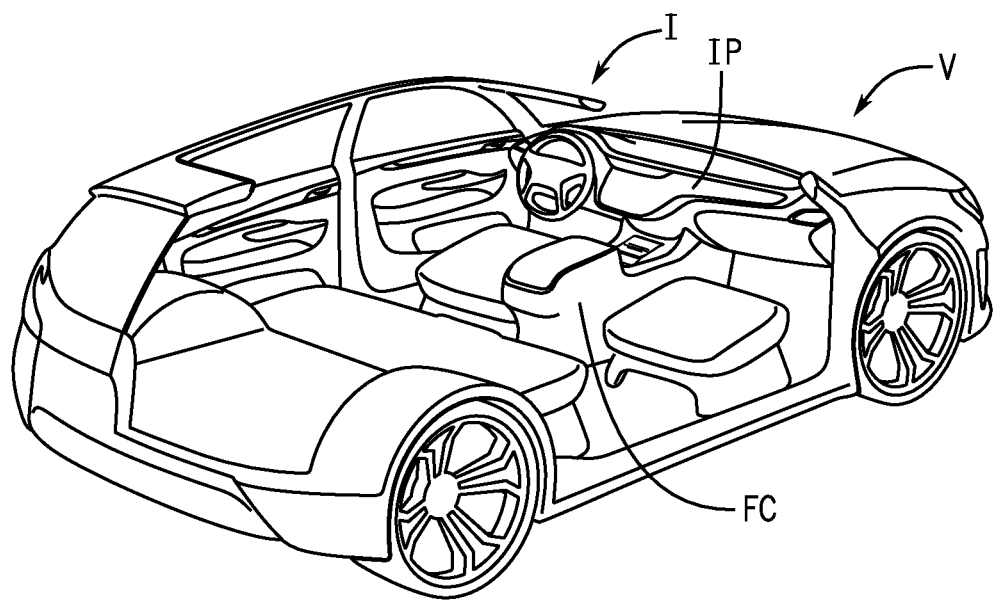
FIG. 1B is a schematic perspective cut-away view of a vehicle showing the interior of the vehicle according to an exemplary embodiment.
Figure 2A:
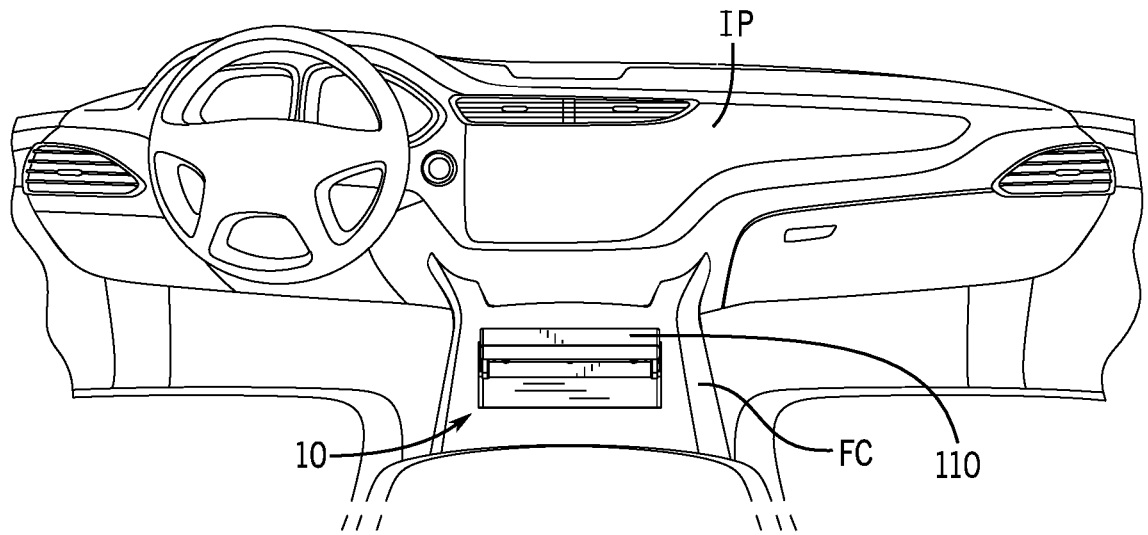
FIGS. 2A and 2B are schematic front perspective views of an interior of a vehicle showing a storage compartment according to an exemplary embodiment.
Figure 2B:
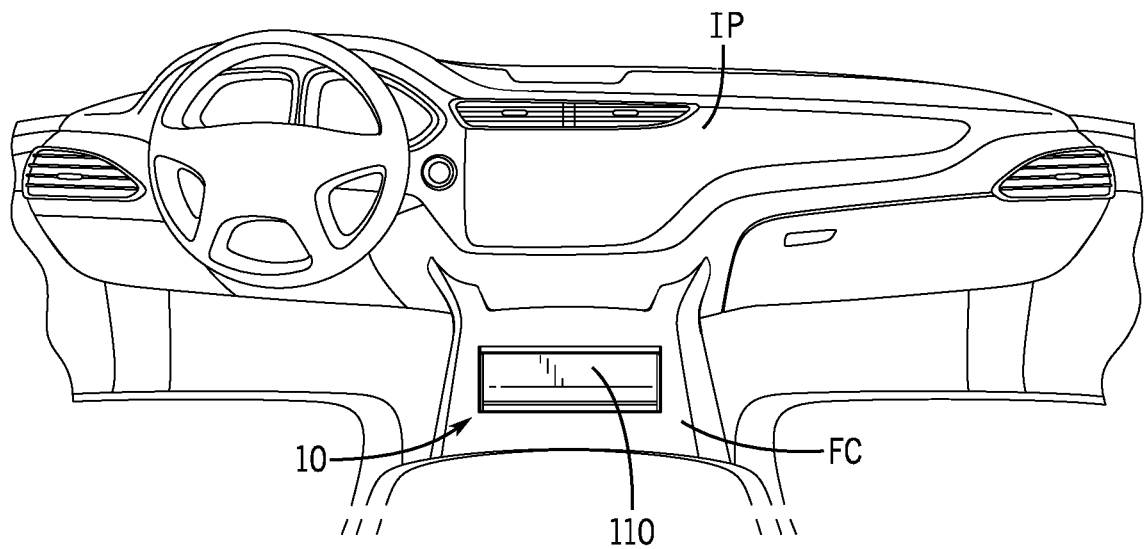

Referring to FIGS. 1A and 1B, a vehicle V is shown including an interior I with instrument panel IP and floor console FC. As shown in FIGS. 2A and 2B according to an exemplary embodiment, a storage compartment or console 10 with a cover 110 is provided between the instrument panel IP and floor console FC. As shown in FIG. 2A, the cover 110 is in a first or open position. As shown in FIG. 2B, the cover 110 is in a second or closed position. According to an exemplary embodiment, console 10 may comprise an interior storage compartment configured to store/hold items.

According to an exemplary embodiment as shown schematically in FIGS. 3, 4, 5A to 5D, 6A to 6C, 7A to 7E, 8A to 8C, 9A, 9B, 10A, 10B, 11, 12A, 12B, 13A, 13B, 14A, 14B, 15, 16A, 16B and 17A to 17I, a storage compartment or console 10 for a vehicle interior may comprise a base 200 comprising an opening 171, a track 238 and a door 100 configured (a) to move along track 238 from an open position to a closed position to cover opening 171 of base 200 and (b) to move from the closed position to the open position. Door 100 may be configured to move in a direction transverse to track 238 from an offset position as shown schematically in FIGS. 13B, 17A to 17C, 17G to 17 I, 18A and 18C toward a biased position as shown schematically in FIGS. 5A to 5D, 6A to 6C, 13A, 14A, 14B, 15, 16A, 16B, 17D to 17 F and 18B. See FIGS. 13B, 17A, 17G, 18A and 18C. Door 100 may comprise a spring 133 configured to bias door 100 toward the biased position. See FIGS. 13A, 14A, 14B, 17D to 17F and 18B. Door 100 may comprise a spring 133, a first arm 131 and a second arm 132; spring 133 may be configured to move first arm 131 and second arm 132 against base 200 to prevent rotation of door 100 relative to base 200 and center door 100 between walls of base 200. See FIGS. 13A, 14A, 14B, 17D to 17F and 18B. Door 100 may comprise a gear 134 configured to couple first arm 131 and second arm 132; first arm 131 may comprise a first rack 135A and second arm 132 may comprise a second rack 135B; first rack 135A and second rack 135B may be configured to engage gear 134. See FIGS. 13A, 13B, 14A, 14B, 17A to 17I and 18A to 18C. Track 238 may comprise a first track 238A and a second track 238B; first arm 131 may be configured to slide along first track 238A and second arm 132 may be configured to slide along second track 238B to guide movement of door 100 relative to base 200. See FIGS. 3, 5A to 5D, 6A to 6C, 7A to 7C, 8A to 8C, 13A, 13B, 14A, 14B, 15, 16B, 17A to 17I and 18A to 18C. Spring 133 may be configured to provide a force to at least one of: first arm 131 to move door 100 from the offset position toward the biased position; second arm 132 to move door 100 from the offset position toward the biased position. See FIGS. 13B and 13A. Storage compartment or console 10 may comprise a mechanism 20 configured to move door 100 from the open position to the closed position; mechanism 20 may comprise at least one gear 121 and base 200 may comprise at least one rack 221; the at least one gear 121 may be configured to rotate along the at least one rack 221 to move door 100 relative to base 200; the at least one gear 121 may be configured to slide along the at least one rack 221 as door 100 moves between the offset position and the biased position. See FIGS. 3, 5A to 5D, 6A to 6C, 10A, 10B, 13A, 13B, 14A, 14B, 15, 16A, 17A to 17I and 18A to 18C.

According to an exemplary embodiment as shown schematically in FIGS. 3, 4, 5A to 5D, 6A to 6C, 7A to 7E, 8A to 8C, 9A, 9B, 10A, 10B, 11, 12A, 12B, 13A, 13B, 14A, 14B, 15, 16A, 16B and 17A to 17I, a storage compartment or console 10 for a vehicle interior may comprise a base 200 comprising an opening 171, a track 238 and a door 100 configured (a) to move along track 238 from an open position to a closed position to cover opening 171 of base 200 and (b) to move from the closed position to the open position. Door 100 may comprise a spring 133 configured to bias door 100 from a first offset position as shown schematically in FIGS. 13B, 17A to 17C and 18A toward a centered position as shown schematically in FIGS. 5A to 5D, 6A to 6C, 13A, 14A, 14B, 15, 16A, 16B, 17D to 17 F and 18B and from a second offset position as shown schematically in FIGS. 17G to 17 I and 18C toward the centered position. See FIGS. 13A, 14A, 14B, 17D to 17F and 18B. Door 100 may be configured to move in a direction transverse to track 238 from the first offset position toward the centered position. See FIGS. 13B, 17A, 17G, 18A and 18C. Door 100 may comprise a first arm 131 and a second arm 132; spring 133 may be configured to move first arm 131 and second arm 132 against base 200 to prevent rotation of door 100 relative to base 200 and center door 100 between walls of base 200. See FIGS. 13A, 14A, 14B, 17D to 17F and 18B. When door 100 moves from the centered position toward the first offset position, one of first arm 131 and second arm 132 may be configured to move relative to base 200 and the other of first arm 131 and second arm 132 may be configured to maintain a position relative to base 200. See FIGS. 13B, 17A to 17C and 18A. Door 100 may comprise a gear 134 configured to couple first arm 131 and second arm 132; first arm 131 may comprise a first rack 135A and second arm 132 may comprise a second rack 135B; first rack 135A and second rack 135B may be configured to engage gear 134. See FIGS. 13A, 13B, 14A, 14B, 17A to 17I and 18A to 18C. Track 238 may comprise a first track 238A and a second track 238B; first arm 131 may be configured to slide along first track 238A to guide movement of door 100 relative to base 200 and second arm 132 may be configured to slide along second track 238B to guide movement of door 100 relative to base 200. See FIGS. 3, 5A to 5D, 6A to 6C, 7A to 7C, 8A to 8C, 13A, 13B, 14A, 14B, 15, 16B, 17A to 17I and 18A to 18C. Spring 133 may be configured to provide a force to at least one of first arm 131; second arm 132 to move door 100 from the first offset position toward the centered position. See FIGS. 13A, 14A, 14B, 17D to 17F and 18B. Storage compartment or console 10 may comprise a mechanism 20 configured to move door 100 from the open position to the closed position; mechanism 20 may comprise at least one gear 121 and base 200 may comprise at least one rack 221, the at least one gear 121 may be configured to rotate along the at least one rack 221 to move door 100 relative to base 200; the at least one gear 121 may be configured to slide along the at least one rack 221 as door 100 moves between the first offset position, the biased position and the second offset position. See FIGS. 3, 5A to 5D, 6A to 6C, 10A, 10B, 13A, 13B, 14A, 14B, 15, 16A, 17A to 17I and 18A to 18C.

According to an exemplary embodiment as shown schematically in FIGS. 3, 4, 5A to 5D, 6A to 6C, 7A to 7E, 8A to 8C, 9A, 9B, 10A, 10B, 11, 12A, 12B, 13A, 13B, 14A, 14B, 15, 16A, 16B and 17A to 17I, a storage compartment or console 10 for a vehicle interior may comprise a base 200 comprising an opening 171, a track 238 and a door 100 configured (a) to move along track 238 from an open position to a closed position to cover opening 171 of base 200 and (b) to move from the closed position to the open position. Door 100 may be configured to move in the closing direction (a) along a first offset path as shown schematically in FIGS. 17A to 17C, (b) along a biased path as shown schematically in FIGS. 17D to 17F, (c) along a second offset path as shown schematically in FIGS. 17G to 17I. The first offset path may be generally parallel to the biased path as shown schematically in FIGS. 17A to 17F. Storage compartment or console 10 may comprise a mechanism 20 configured to move door 100 from the open position to the closed position along the first offset path, along the biased path and along the second offset path. The biased path may comprise a centered path; door 100 may be moved toward the centered path by a spring 133. Storage compartment or console 10 may comprise at least one of (a) a console; (b) a floor console; (c) a center console; (d) an instrument panel; (e) a door; (f) a cockpit; (g) a storage compartment.

According to an exemplary embodiment as shown schematically in FIG. 3, a storage compartment shown as console 10 may comprise a door 100 and a base 200. Base 200 may comprise at least one rack, a first track 238A, a second track 238B and a catch 260. Base 200 may be configured to support door 100 and allow door 100 to move between open and closed positions. According to an exemplary embodiment, the at least one rack may include a first rack 221A and a second rack 221B (See FIGS. 13A and 13B) on opposite sides of base 200. First rack 221A and second rack 221B may be placed on the exterior of base 200 as shown schematically in FIGS. 3, 13A and 13B. According to an exemplary embodiment, door 100 may be configured to center itself between walls of base 200.

According to an exemplary embodiment as shown schematically in FIG. 4, door 100 may comprise a cover 110, a substrate 140, a drive assembly or mechanism 20 and a centering mechanism 30. According to an exemplary embodiment, drive mechanism 20 and centering mechanism 30 may be held between cover 110 and the substrate 140. Drive mechanism 20 may comprise a first gear 121A, a second gear 121B, a damper 123, a damper housing 124, a shaft 125, a spacer 126 and a spring 127. Drive mechanism 20 may comprise a single gear in place of first gear 121A and second gear 121B. As shown schematically in FIGS. 4 and 12A, spring 127 may comprise a torsion spring. Spring 127 and damper 123 may both be coupled to shaft 125. Damper 123 may be installed in parallel with spring 127 and may be located between first gear 121A and damper housing 124. Spacer 126 may be fitted between shaft 125 and spring 127. Spring 127 may be configured to provide torque to shaft 125. Spring 127 may be preloaded to provide torque before assembly of drive mechanism 20. First gear 121A and second gear 121B may be coupled to opposing ends of shaft 125.

According to an exemplary embodiment as shown schematically in FIG. 4, centering mechanism 30 may be comprised of a first arm 131, a second arm 132, a spring 133 and a gear 134. Spring 133 may be a U-spring. Gear 134 may be a wheel. First arm 131 may comprise an end 138A comprising a pin 139A, and second arm 132 may comprise an end 138B comprising a pin 139B. Pin 139A and pin 139B at ends 138A and 138B of first and second arms 131 and 132 may guide door 100 when traveling between the open position and the closed position. First arm 131 and second arm 132 may be coupled to spring 133 and gear 134. Gear 134 may be configured to couple first arm 131 and second arm 132. A portion of first arm 131 may comprise a first rack 135A and a portion of second arm 132 may comprise a second rack 135B. First rack 135A and second rack 135B may be configured to engage and be driven by gear 134. See FIGS. 13A, 13B, 14A and 14B.

According to an exemplary embodiment as shown schematically in FIG. 4, a latch lever 160 may be located on substrate 140. Latch lever 160 may be configured to engage catch 260 on base 200. Cover 110 and substrate 140 may be held together by fasteners 150. See FIGS. 4 and 11. Fasteners 150 may comprise screws. Cover 110 may be configured to cover spring 133 and gear 134. First arm 131 and second arm 132 may extend from cover 110 and substrate 140 to contact base 200 when door 100 is supported by base 200. Cover 110 and substrate 140 may be joined together by conventional arrangements.

Figure 13A:
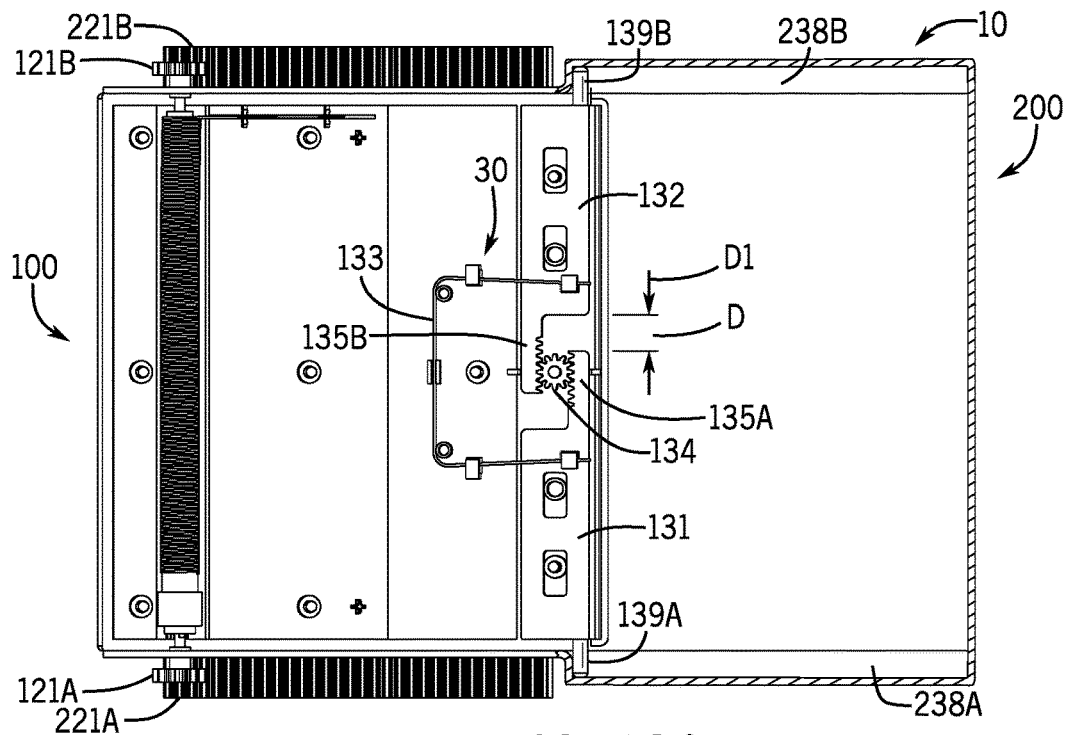
FIGS. 13A and 13B are schematic top plan views of the door of a storage compartment according to an exemplary embodiment.
Figure 13B:
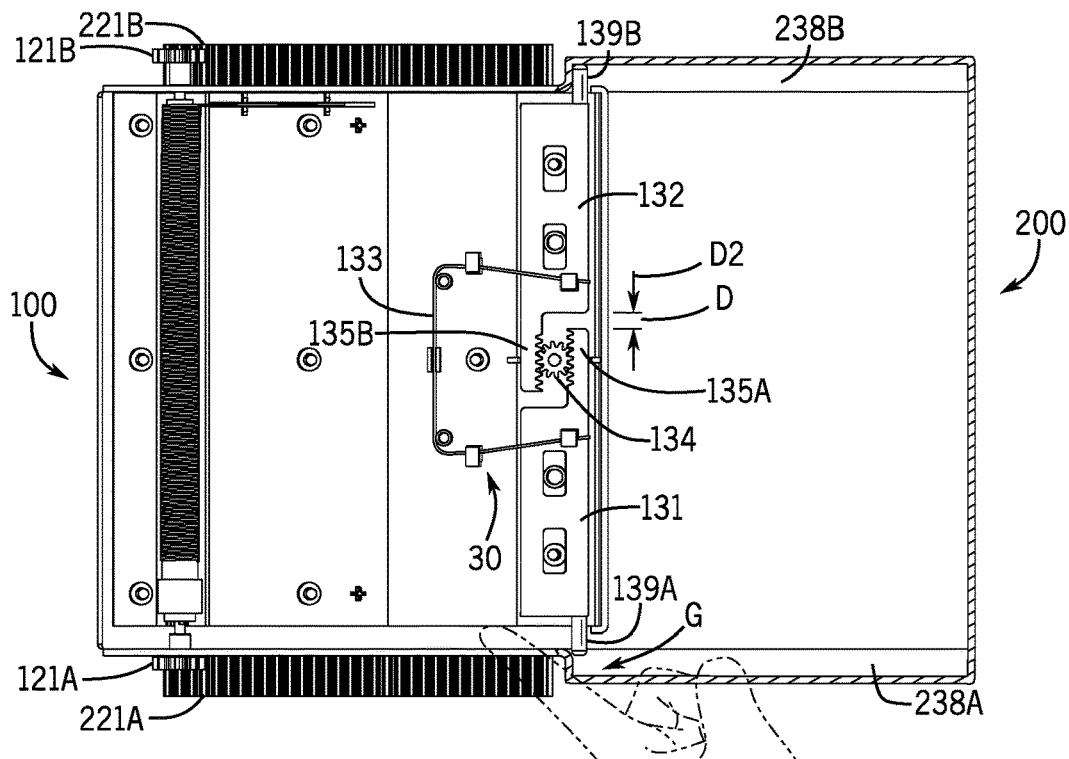

According to an exemplary embodiment shown schematically in FIGS. 3, 13A and 13B, when door 100 is supported by base 200, first gear 121A on a side of door 100 may engage with first rack 221A on the side of base 200, and second gear 121B on the opposite side of door 100 from first gear 121A may engage with second rack 221B on the opposite side of base 200 from first rack 221A. Cover 110 may partially close the interior of base 200. Pin 139A and pin 139B may be respectively fitted into first track 238A and second track 238B on corresponding sides of base 200.

According to an exemplary embodiment as shown schematically in FIGS. 5A to 5D, door 100 of storage compartment or console 10 may be unlatched from base 200 and move from an open position to a closed position. As shown schematically in FIG. 5A, door 100 may be latched to base 200. A latch mechanism 16 comprising latch lever 160 and catch 260 is shown schematically according to an exemplary embodiment in FIGS. 7D and 7E. According to an exemplary embodiment, latch mechanism 16 may be configured to prevent movement of door 100 from the open position to the closed position and release door 100 from the base 200 to allow automatic movement of door 100 from the open position to the closed position. Latch lever 160 may engage catch 260 to counteract torque provided by spring 127 to keep door 100 attached to base 200 relative to an opening 171. As shown schematically in FIG. 5B, a hand H may push on door 100 in a direction A to release latch mechanism 16. Force from hand H may disengage latch lever 160 from catch 260 and allow door 100 to automatically move in a direction B from the open position to closed position (e.g. under the force of the spring). Latch mechanism 16 may comprise a push/push type latch that alternates between an engaged and a disengaged position when latch lever 160 is pushed into catch 260 in direction A.

Figure 5A:
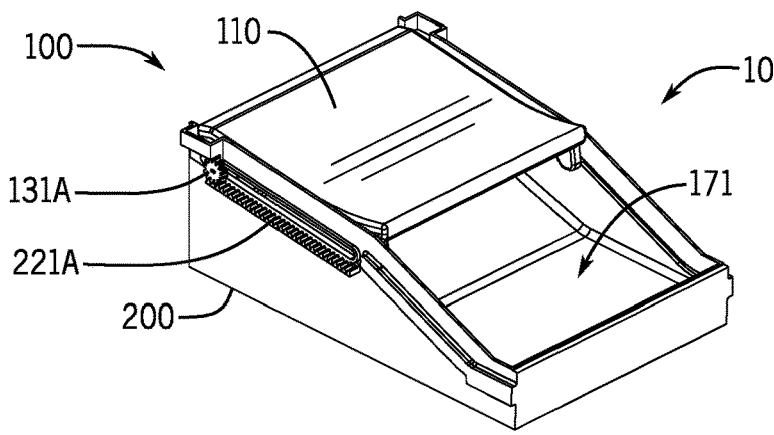
FIGS. 5A to 5D are schematic perspective views of a storage compartment according to an exemplary embodiment.
Figure 5B:
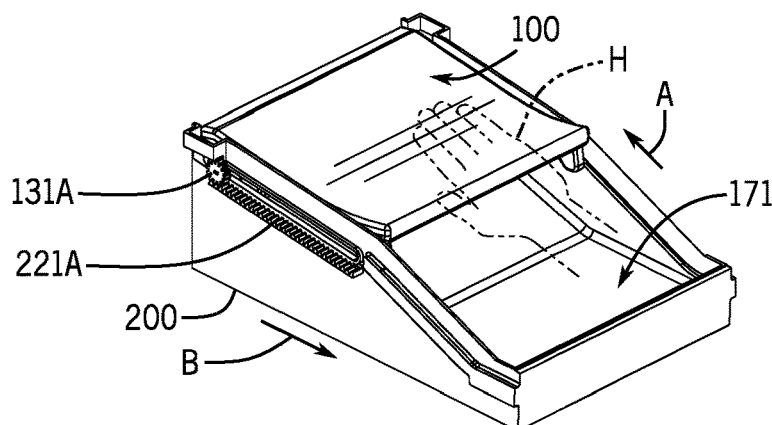
Figure 5C:
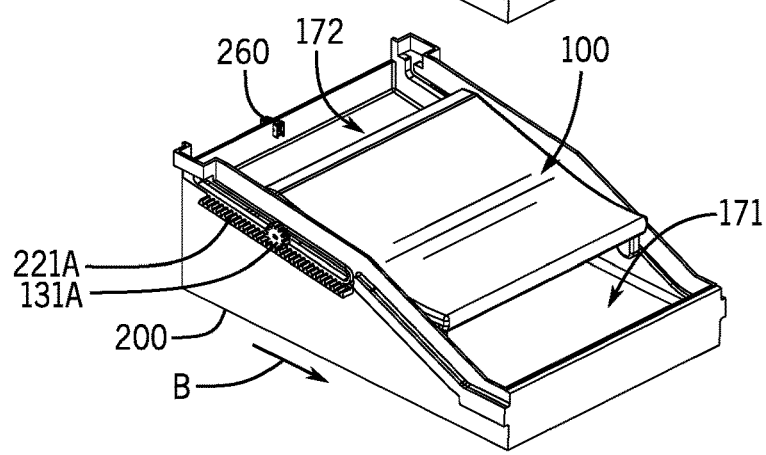
Figure 5D:
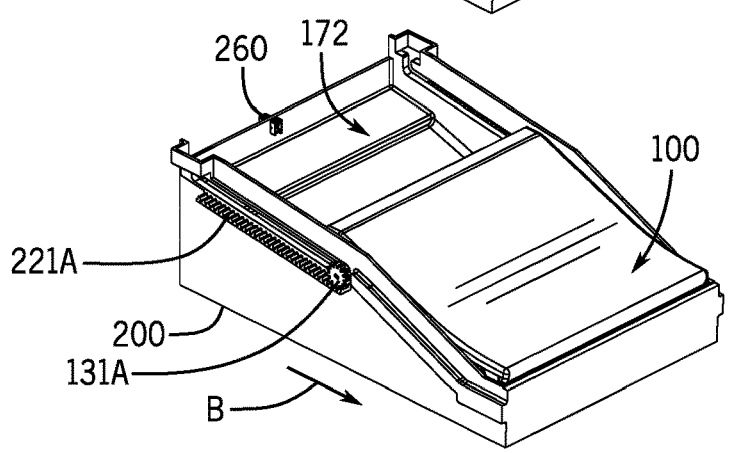

According to an exemplary embodiment as shown schematically in FIG. 5C, when latch mechanism 16 has been disengaged, door 100 may pass through an intermediate position towards the closed position relative openings 171 and 172. According to an exemplary embodiment, first gear 131A and second gear 131B (shown schematically in FIGS. 13A and 13B) may rotate along first rack 221A and second rack 221B (shown schematically in FIGS. 13A and 13B) as door 100 moves relative to base 100. Torque provided by spring 127 to shaft 125 may propel and rotate first gear 121A and second gear 121B along the corresponding first rack 221A and the second rack 221B to automatically move door 100 relative to base 200 when latch mechanism 16 is disengaged. Damper 123 may resist movement of door 100 between the open and closed positions resulting in a dampened (i.e. smooth) motion for door 100. Spring 127 and damper 123 may be individually selected and combined to provide a specific speed for door movement. As shown schematically in FIG. 5D, door 100 may move from the intermediate position to the closed position with actuation from shaft 125. Spring 127 may continue to apply force to door 100 against base 200 when door 100 is in the closed position to keep door 100 in the closed position relative to opening 172. See FIGS. 5D, 7C and 10B.

Figure 6A:
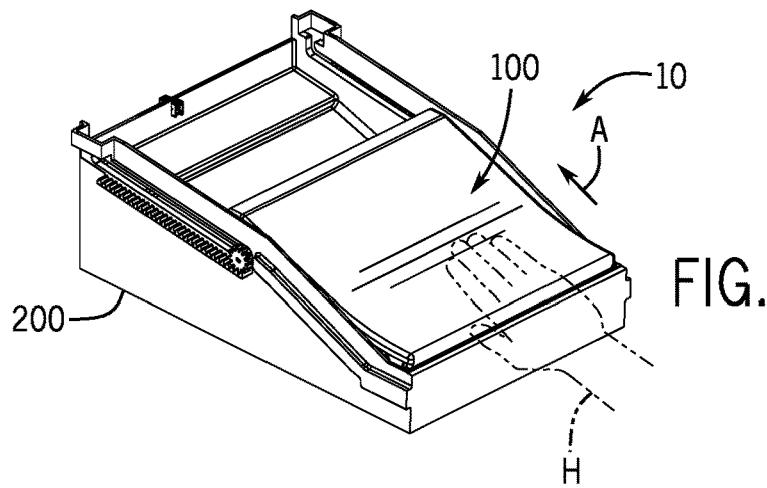
FIGS. 6A to 6C are schematic perspective views of a storage compartment according to an exemplary embodiment.
Figure 6B:
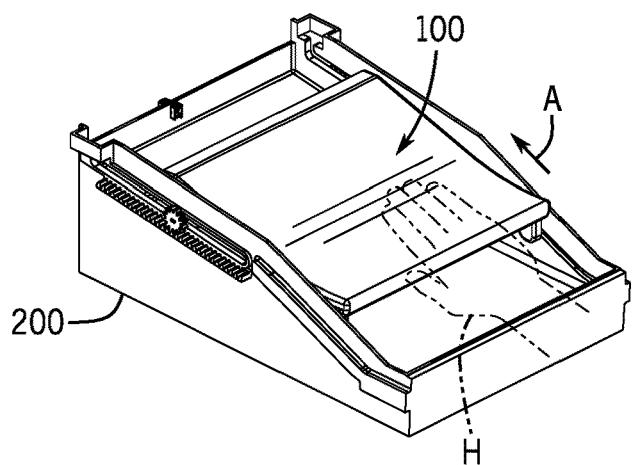
Figure 6C:
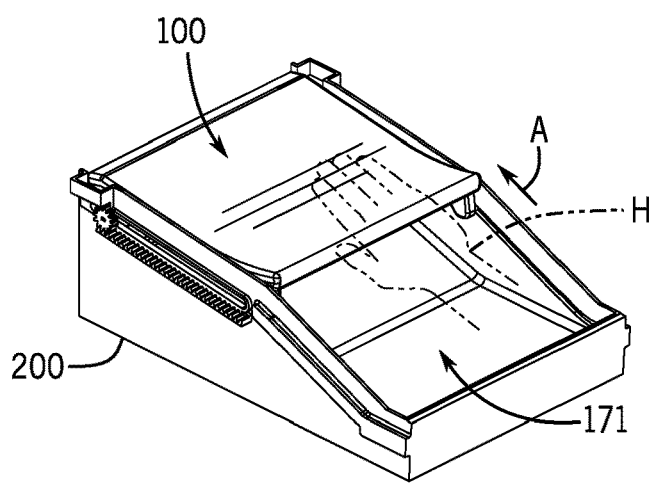

According to an exemplary embodiment as shown schematically in FIGS. 6A to 6C, door 100 of storage compartment or console 10 may be configured to move with respect to opening 171 from the closed position to the open position. As shown schematically in FIG. 6A, hand H may move door 100 from the closed position in direction A without the actuation of a latching device, a handle, or a locking device. As shown schematically in FIG. 6B, hand H may exert an external force sufficient to overcome torque from spring 127. The external force may move door 100 from the closed position through the intermediate position to the open position. As door 100 moves from the closed position towards 127. As shown schematically in FIG. 6C, external force may be required to engage door 100 in the latched position.

According to an exemplary embodiment as shown schematically in FIGS. 7A to 7E, door 100 may be unlatched and moved from the open position to the closed position. As shown schematically in FIG. 7A, hand H is shown pushing on door 100 in direction A to release latch mechanism 16. Latch lever 160 and catch 260 may move from an engaged position as shown schematically in FIG. 7D to a disengaged position as shown schematically in FIG. 7E when hand H pushes door 100 in direction A. As shown schematically in FIG. 7B, door 100 may move through the intermediate position in direction B as end 138A (shown schematically in FIG. 9A) and end 138B move along first track 238A (shown schematically in FIGS. 9A, 13A and 13B) and second track 238B respectively. As shown schematically in FIG. 7C, door 100 may move from the intermediate position to the closed position. End 138A and end 138B may reach the end of first track 238A and second track 238B and may stop door 100 at the closed position relative to opening 171. According to an exemplary embodiment, an opening 172 may be exposed when door 100 is in the closed position.

Figure 8A:
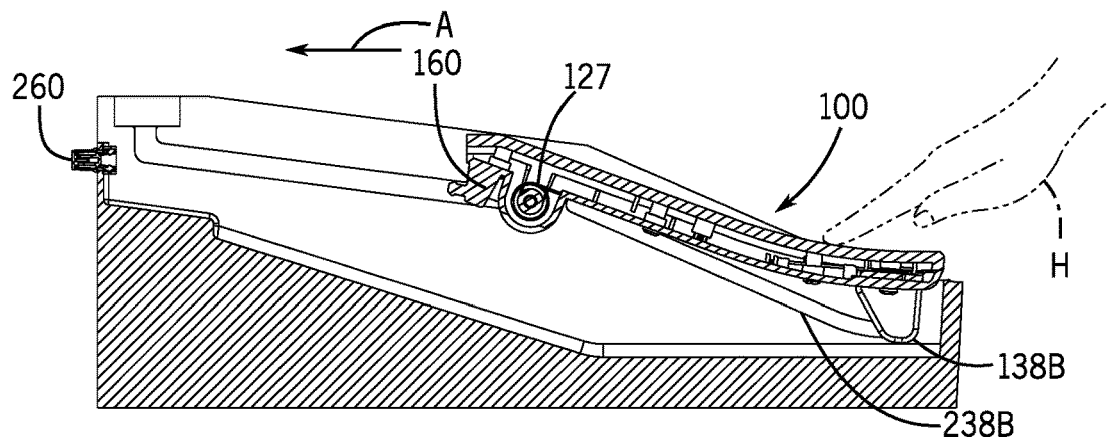
FIGS. 8A to 8C are schematic cross-section views of a storage compartment according to an exemplary embodiment.
Figure 8B:
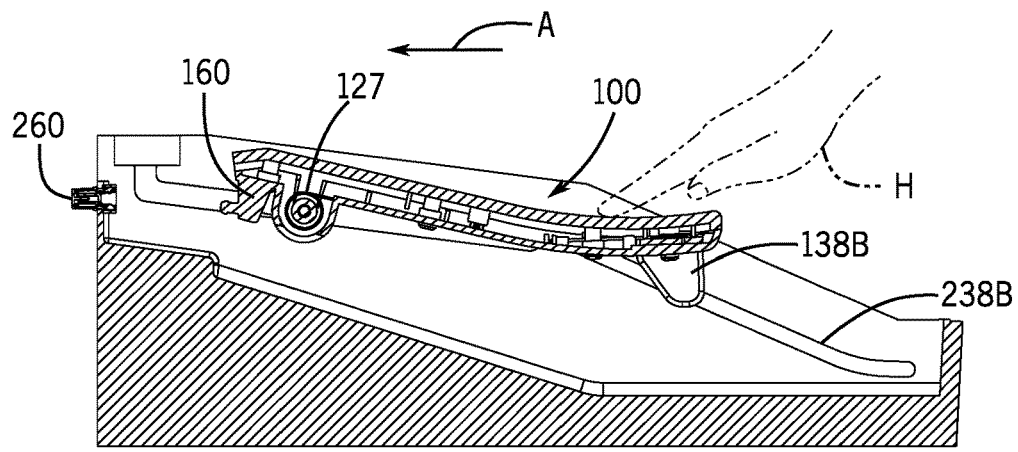
Figure 8C:
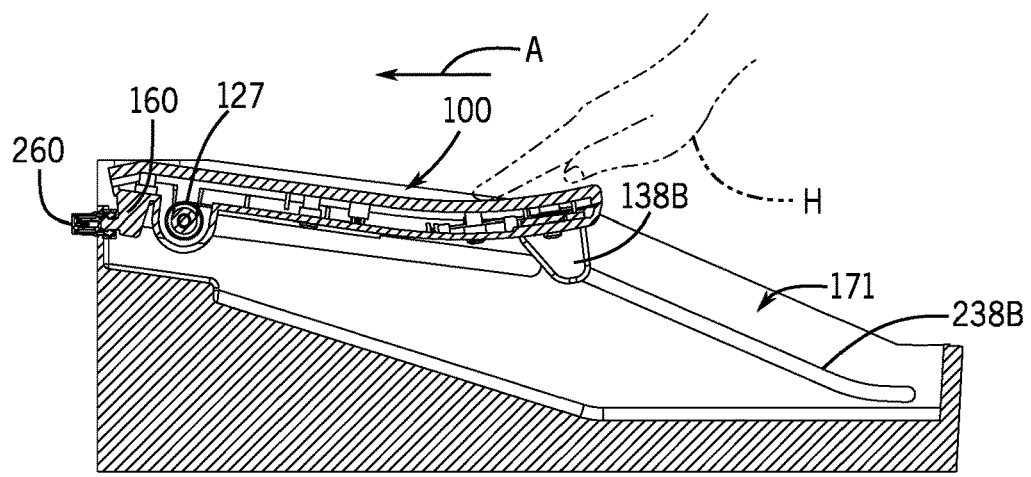

According to an exemplary embodiment as shown schematically in FIGS. 8A to 8C, hand H may push door 100 from the closed position to the open position relative opening 171. As shown schematically in FIG. 8A, hand H may push door 100 in direction A from the closed position towards the intermediate position by overcoming torque from spring 127 and damper 123 (as shown schematically in FIG. 12A). As shown schematically in FIG. 8B, hand H may push door 100 towards the open position which may rewind spring 127 on shaft 125 (as shown schematically in FIG. 12A). End 138A (as shown schematically in FIG. 12A) and end 138B may follow first track 238A (as shown schematically in FIGS. 9A, 13A and 13B) and second track 238B to provide a smooth motion of door 100. As shown schematically in FIG. 8C, hand H may push door 100 to the open position; door 100 may engage latch mechanism 16 to counteract torque from spring 127 which may expose opening 171. Latch lever 160 may engage catch 260 when latch mechanism 16 is engaged.

Figure 9A:
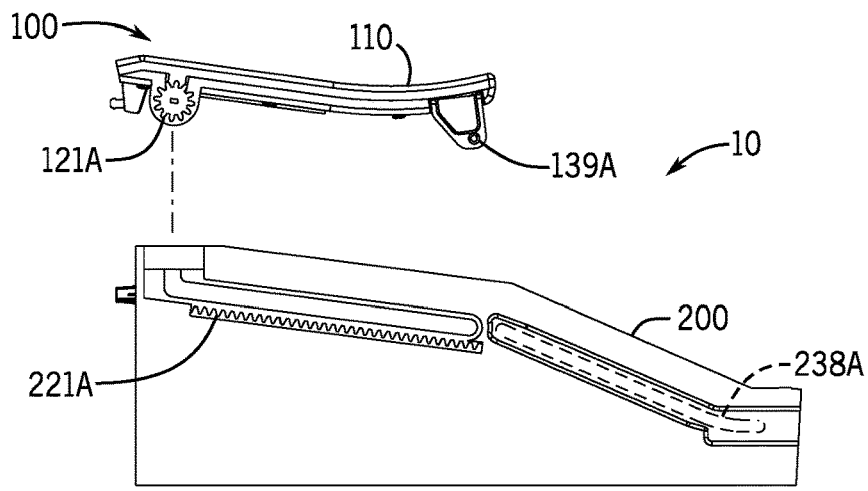
FIGS. 9A and 9B are schematic exploded side views of a storage compartment according to an exemplary embodiment.
Figure 9B:
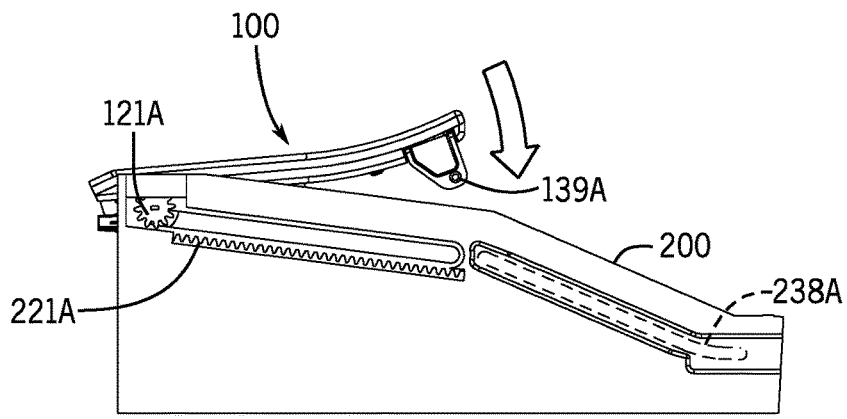
Figure 10A:
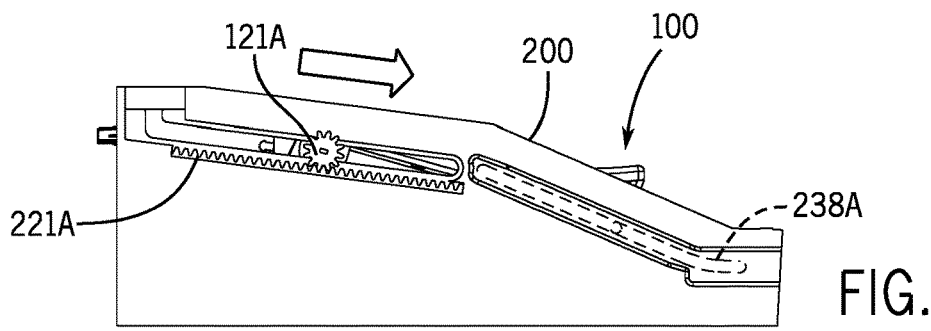
FIGS. 10A and 10B are schematic side views showing a storage compartment according to an exemplary embodiment.
Figure 10B:
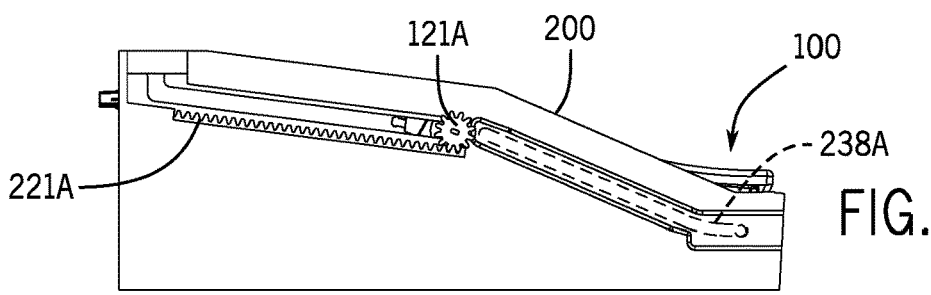
Figure 12A:
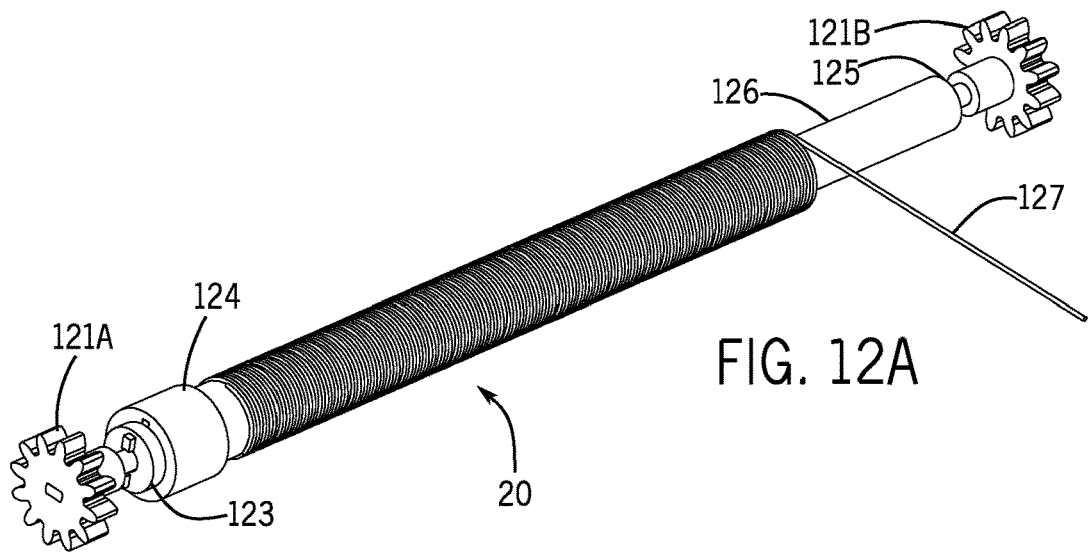
FIG. 12A is a schematic perspective view of the shaft for the door of a storage compartment according to an exemplary embodiment.

According to an exemplary embodiment as shown schematically in FIGS. 9A and 9B, storage compartment or console 10 may comprise a door 100 and a base 200 having a first track 238A on the interior side of base 200 and a first rack 221A molded to an exterior side of base 200. First rack 221A may be a separate part assembled to base 200. Door 100 may comprise a first gear 121A, a cover 110 and a pin 139A. As shown schematically in FIGS. 9A and 9B, door 100 may be fitted to base 200 with first gear 121A engaging first rack 221A and pin 139A engaging first track 238A. As shown schematically in FIGS. 10A and 10B, door 100 may slide along base 200 from the open position through the intermediate position to the closed position. As shown schematically in FIGS. 10A and 10B, first gear 121A may engage first rack 221A and drive and guide movement of door 100 along base 200.

Figure 11:
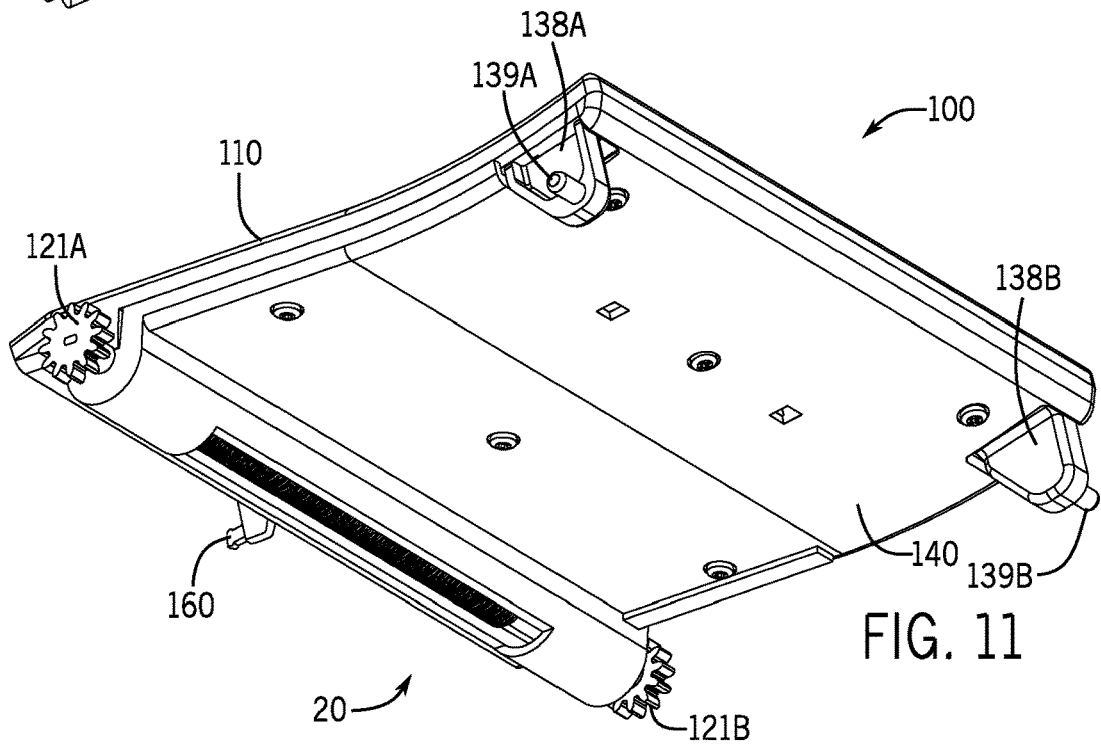
FIG. 11 is a schematic bottom view of the door for a storage compartment according to an exemplary embodiment.
Figure 12B:
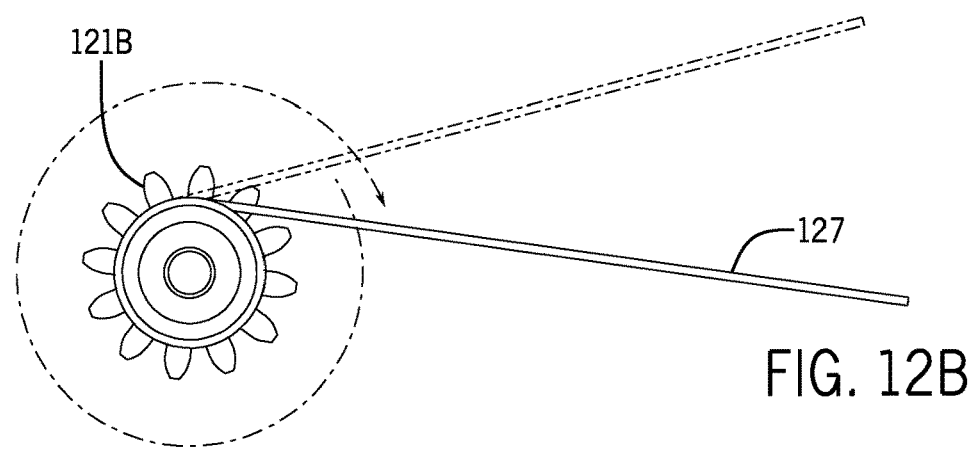
FIG. 12B is a schematic side view of the shaft for the door of a storage compartment according to an exemplary embodiment.

According to an exemplary embodiment as shown schematically in FIG. 11, drive mechanism 20 may be positioned at a front end of door 100 and end 138A comprising pin 139A and end 138B comprising pin 139B may be positioned at a back end of door 100 between cover 110 and substrate 140 such that they extend from door 100. As shown schematically in FIG. 12A, drive mechanism 20 may comprise first gear 121A, second gear 121B, damper 123, damper housing 124, shaft 125, spring 127 and spacer 126. Spring 127 may provide torque to shaft 125 to automatically move door 100 toward the closed position unless an external force is provided to oppose and overcome torque from spring 127.

According to an exemplary embodiment as shown schematically in FIGS. 13A and 13B, storage compartment or console 10 may comprise a centering mechanism 30 configured to control rotation of door 100 relative to base 200. Centering mechanism 30 may comprise a spring 133, a first or driver side arm 131, a second or passenger side arm 132 and a gear 134. First rack 135A and second rack 135B may engage gear 134. Spring 133 may force first arm 131 and second arm 132 against base 200 to prevent rotation of door 100 relative to base 200. See FIGS. 13A, 13B, 14A and 14B. As shown schematically in FIG. 13B, an external force applied on a side of door 100 by hand H may be counteracted by the centering mechanism to prevent rotation of door 100 relative to base 200. As shown schematically in FIG. 13A, a space D having a first distance D1 is established between first arm 131 and second arm 132. As shown schematically in FIG. 13B, space D between the first arm 131 and the second arm 132 may be reduced to a distance D2 when an unbalanced (off-center) force is exerted on a side of door 100. The unbalanced (off-center) force may induce first arm 131 to retract from first track 238A into the interior of base 200. The retracting of first arm 131 may fully or partially disengage pin 139A from first track 238A forming a gap G between pin 139A and first track 238A. An unbalanced (off-center) force applied to an opposite side of door 100 may induce second arm 132 to retract from second track 238B, causing pin 139B to fully or partially disengage from second track 238B forming a gap similar to gap G. See FIG. 13B. As shown schematically in FIGS. 13A and 13B, gap G has a distance equal to the difference between distance D1 and distance D2. According to an exemplary embodiment as shown schematically in FIGS. 13A and 13B, first arm 131 and second arm 132 may be moved in coordination toward the center of door 100 by operation of gear 134 and spring 133. The coordinated movement of first arm 131 and second arm 132 may shrink or expand space D as necessary to maintain the relative position of door 100 with respect to base 200.

Figure 14A:
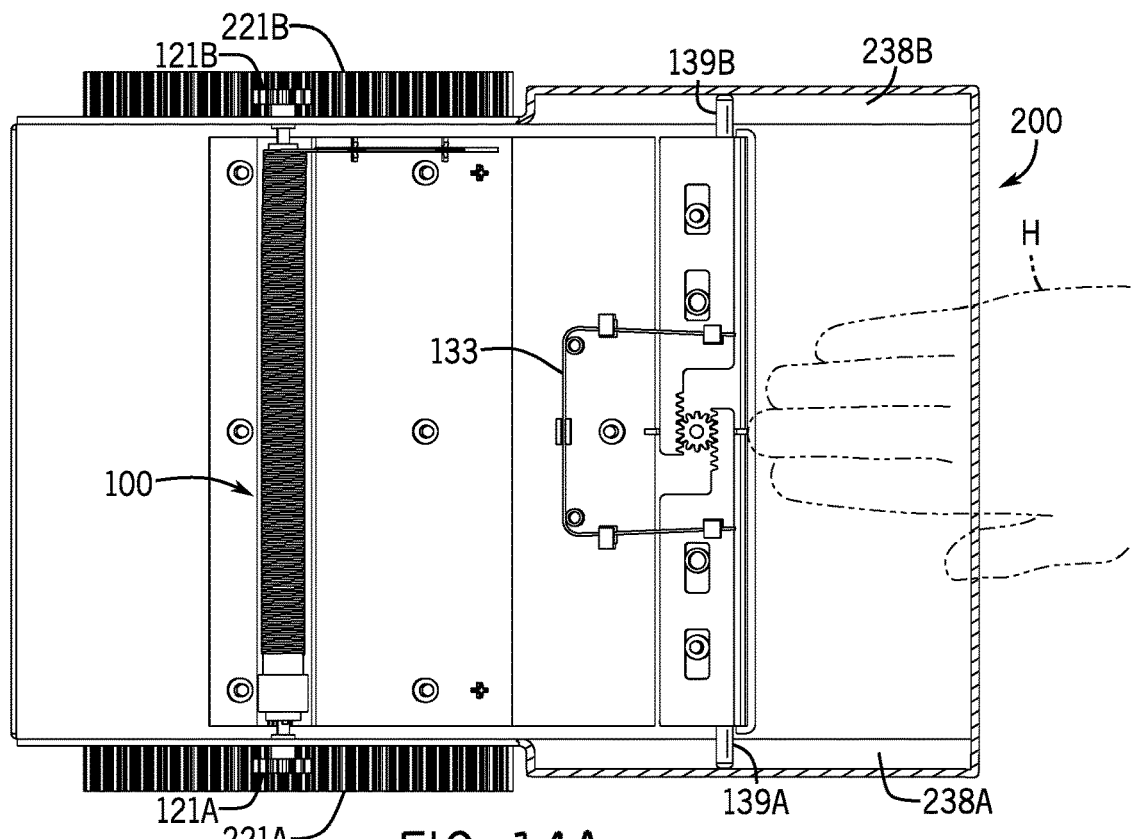
FIGS. 14A and 14B are schematic top plan views of a drive mechanism of a storage compartment according to an exemplary embodiment.
Figure 14B:
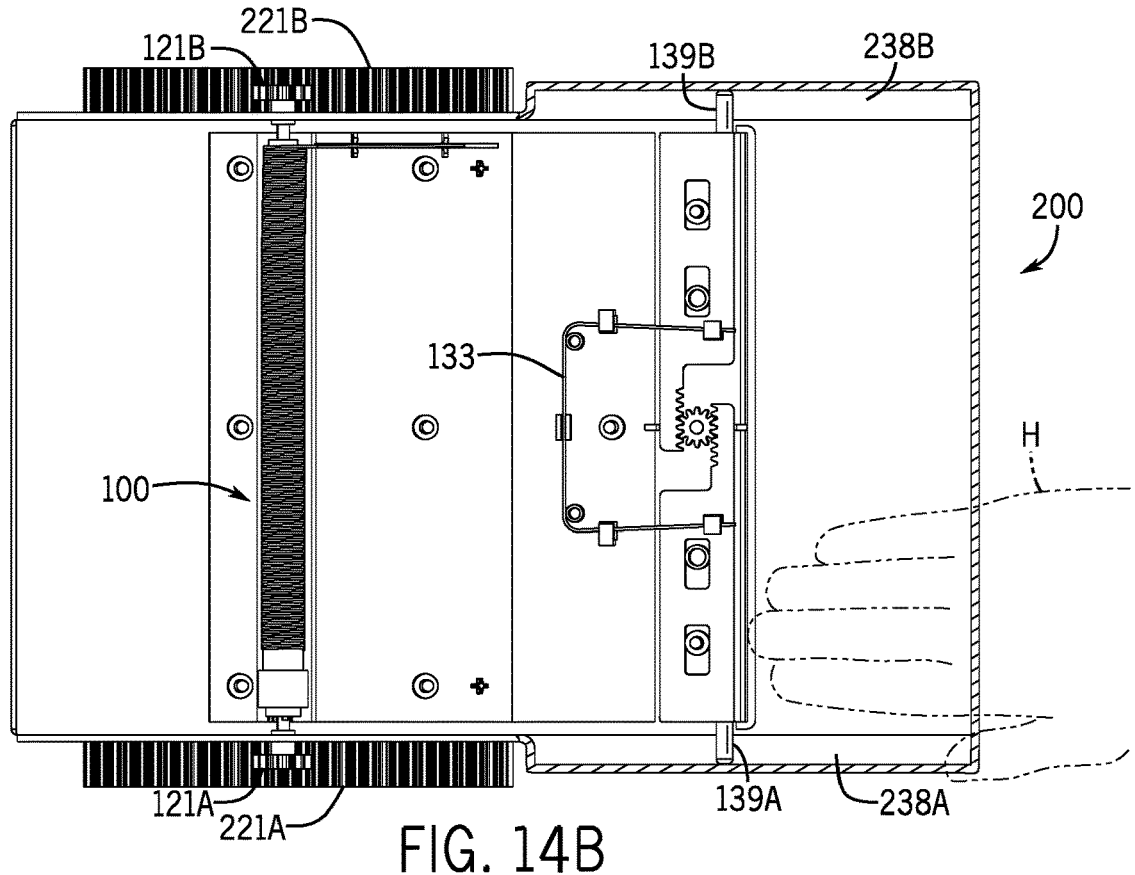

According to an exemplary embodiment as shown schematically in FIGS. 14A and 14B, a force that is applied off-center at door 100 by hand H would not tend to substantially cause twisting or rotational movement of door 100 relative to the base 200 because the force provided by spring 133 on first and second arms 131 and 132 keeps door 100 from moving side to side by driving pins 139A and 139B into first and second tracks 238A and 238B respectively.

Figure 15:
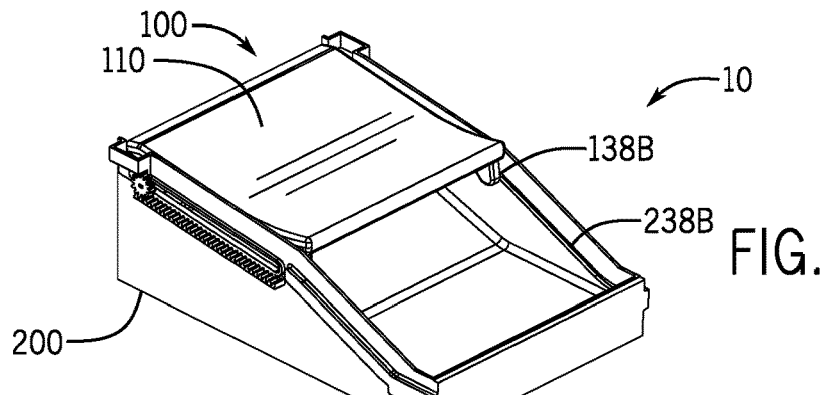
FIG. 15 is a schematic perspective view of a storage compartment according to an exemplary embodiment.
Figure 16A:
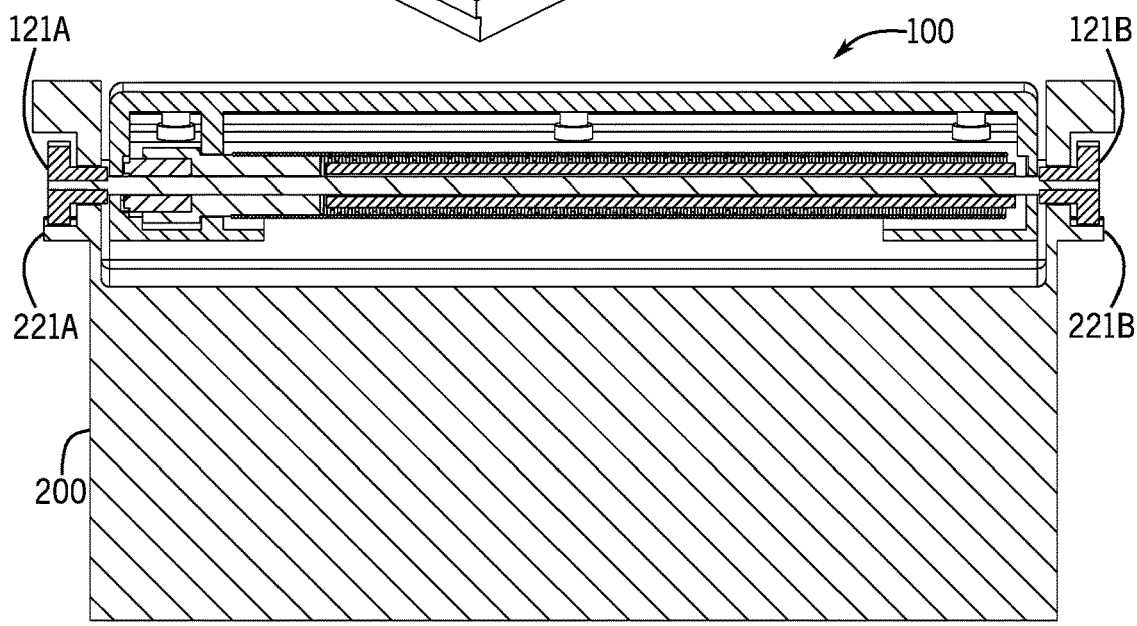
FIG. 16A is a schematic cross-section view of a storage compartment according to an exemplary embodiment.
Figure 16B:
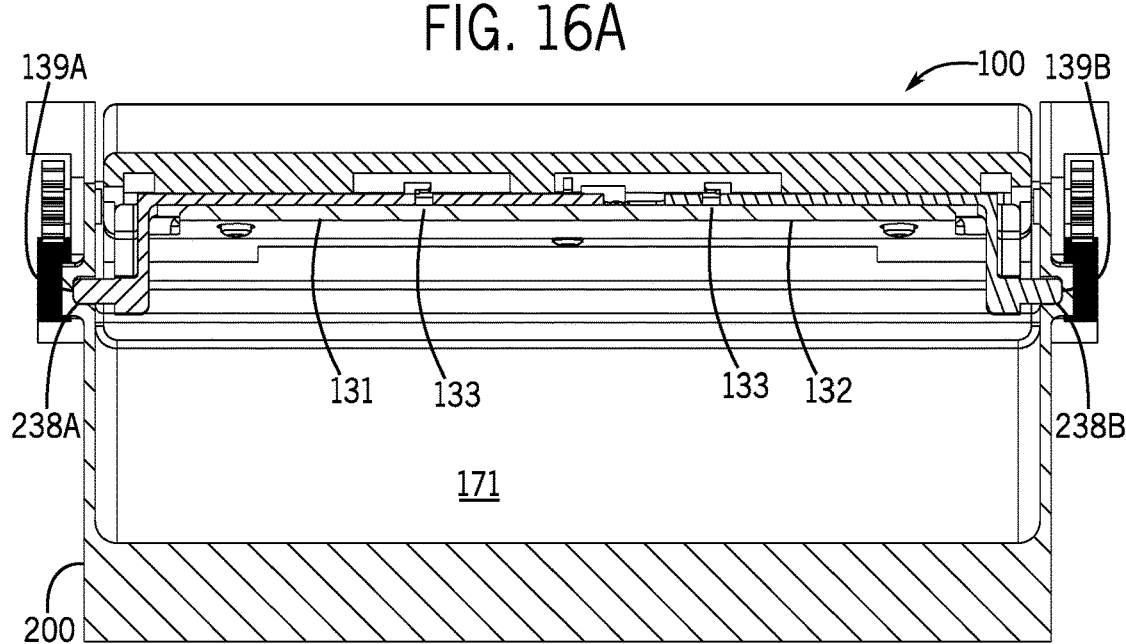
FIG. 16B is a schematic cross-section view of the drive mechanism of a storage compartment according to an exemplary embodiment.

According to an exemplary embodiment as shown schematically in FIGS. 15, 16A and 16B, door 100 may comprise cover 110, first arm 131, second arm 132, spring 133, ends 138A and 138B, and pins 139A and 139B. Base 200 may comprise first rack 221A, second rack 221B, first track 238A and second track 238B. As shown schematically in FIG. 16A, first gear 121A and second gear 121B of door 100 may engage with first rack 221A and second rack 221B of base 200 in a rack and pinion arrangement. According to the exemplary embodiment as shown schematically in FIG. 16A, first gear 121A and second gear 121B may mesh with corresponding first and second racks 221A and 221B of base 200. As shown schematically in FIG. 16B, pin 139A on end 138A of first arm 131 and pin 139B on end 138B of second arm 132 may fit within first track 238A and second track 238B of base 200 to guide movement of door 100 between the open and closed positions relative to opening 171. Spring 133 may push first arm 131 and second arm 132 outward to retain pin 139A and pin 139B against inside walls of first track 238A and second track 238B.

According to an exemplary embodiment as shown schematically in FIGS. 17A to 17C and 18A, door 100 may be configured to move in the closing direction and an opening direction along a first offset path relative to base 200. When door 100 moves along the first offset path, a gap G may be provided between a left side of door 100 and base 200, a gap G may be provided between first arm 131 and base 200, and second arm 132 may slide against base 200.

According to an exemplary embodiment, door 100 may be configured to move in the closing direction and the opening direction along a biased or centered path as shown schematically in FIGS. 17D to 17F and 18B. When door 100 moves along the biased/centered path, a gap G may be provided between a left side of door 100 and base 200, a gap G may be provided between a right side of door 100 and base 200, first arm 131 may slide against base 200, and second arm 132 may slide against base 200.

According to an exemplary embodiment, door 100 may be configured to move in the closing direction and the opening direction along a second offset path as shown schematically in FIGS. 17G to 17I and 18C. When door 100 moves along the second offset path, a gap G may be provided between a right side of door 100 and base 200, a gap G may be provided between second arm 132 and base 200, and first arm 131 may slide against base 200.

According to an exemplary embodiment as shown schematically in FIGS. 13A, 13B, 17A-17I and 18A-18C, first rack 221A and second rack 221B may be configured to enable movement of door 100 along the first offset path, the biased/centered path and the second offset path, and first track 238A and a second track 238B may be configured to enable movement of door 100 along the first offset path, the biased/centered path and the second offset path. A width of first rack 221A may allow first gear 121A to move along first rack 221A to enable movement of door 100 along the first offset path, the biased/centered path and the second offset path. A width of second rack 221B may allow second gear 121B to move along second rack 221B to enable movement of door 100 along the first offset path, the biased/centered path and the second offset path. A width of first track 238A may allow first arm 131 to move along first track 238A to enable movement of door 100 along the first offset path, the biased/centered path and the second offset path. A width of second track 238B may allow second arm 132 to move along second track 238B to enable movement of door 100 along the first offset path, the biased/centered path and the second offset path.

Figure 17C:
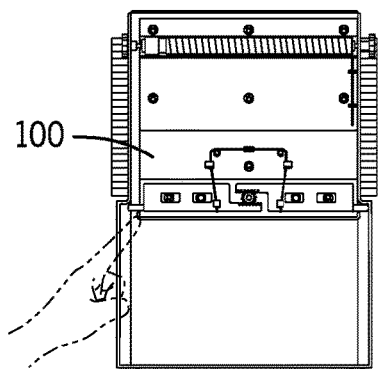
FIGS. 17A to 17I are schematic top plan views of the door of a storage compartment according to an exemplary embodiment.
Figure 17F:
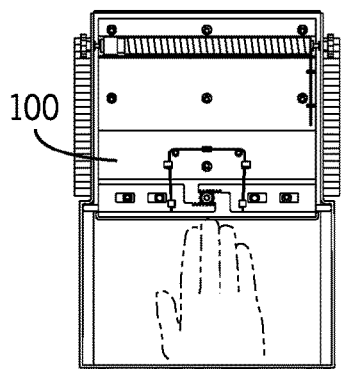
Figure 17I:
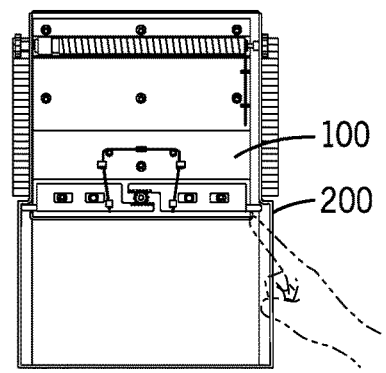
Figure 17B:
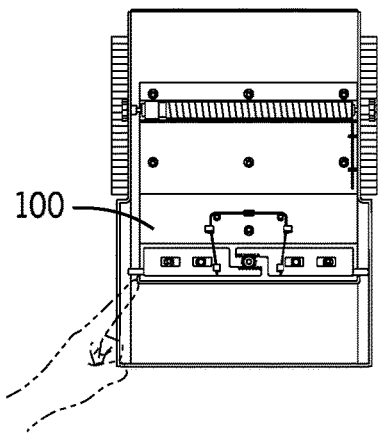
Figure 17E:
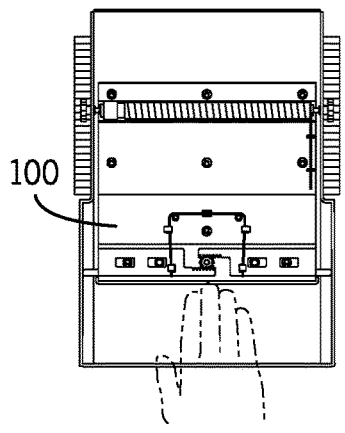
Figure 17H:
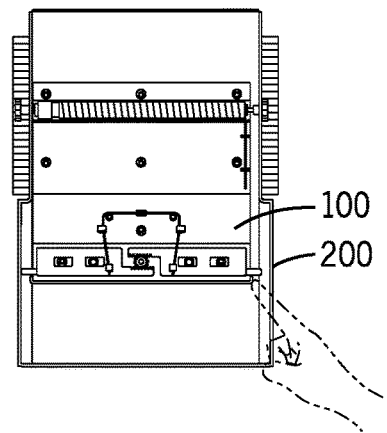
Figure 17A:
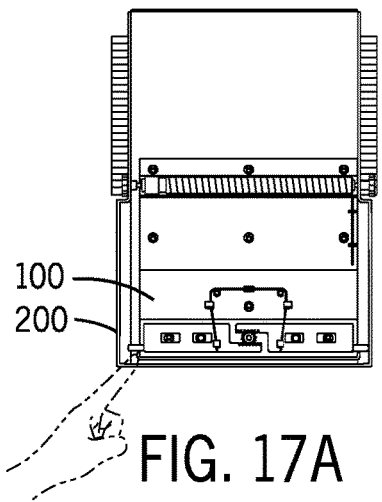
Figure 17D:
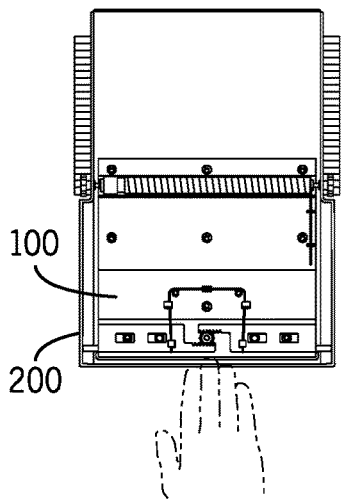
Figure 17G:
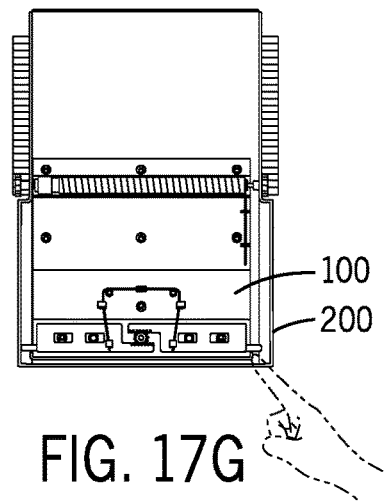
Figure 18A:
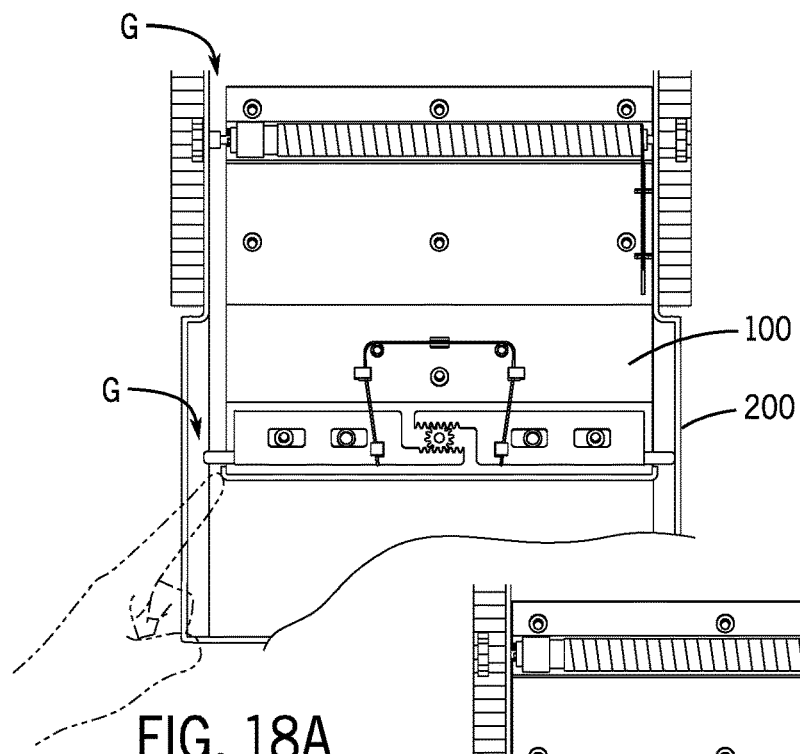
FIGS. 18A to 18C are schematic partial top plan views of the door of a storage compartment according to an exemplary embodiment.
Figure 18C:
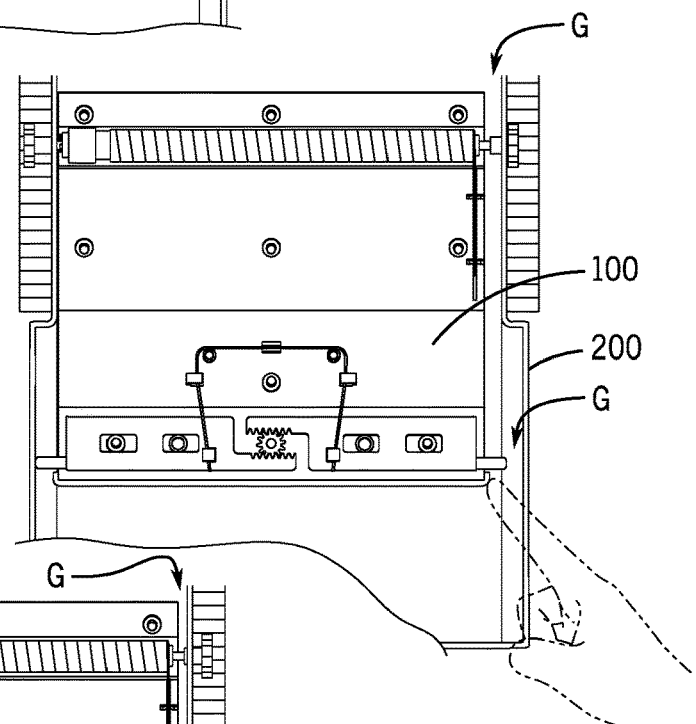
Figure 18B:
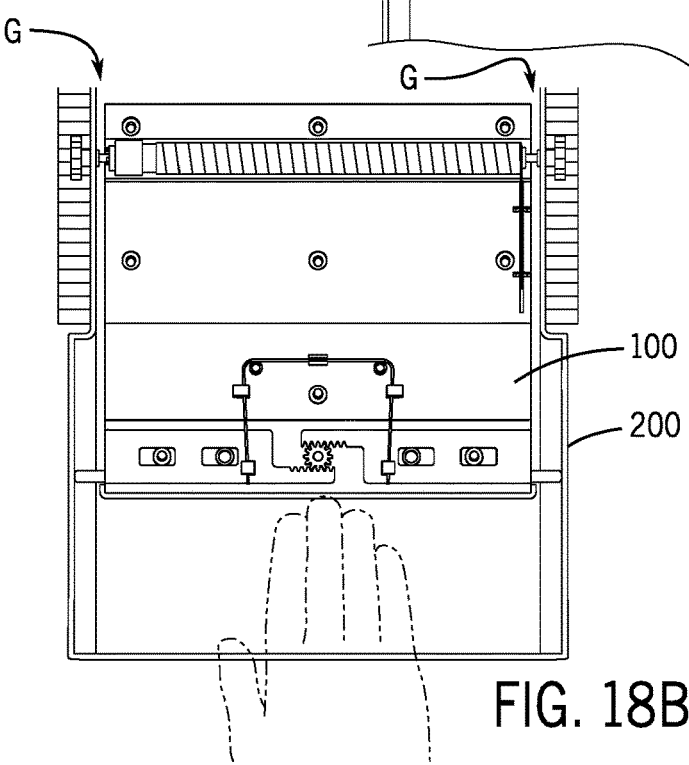

According to an exemplary embodiment, door 100 may be configured to move in a direction transverse to track 238 from an offset position as shown schematically in FIGS. 17A to 17C and 17G to 17I toward a biased position as shown schematically in FIGS. 17D to 17F. In response to an external force, door 100 may be configured to move in a direction transverse to track 238 from the biased position as shown schematically in FIGS. 17D to 17F to the offset position as shown schematically in FIGS. 17A to 17C and 17G to 17I.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

What is claimed is:

1. A component for a vehicle interior comprising:
   a base comprising an opening;
   a track; and
   a door configured (a) to move along the track from an open position to a closed position to cover the opening of the base and (b) to move from the closed position to the open position;
   wherein the door is configured to move in a direction transverse to the track from an offset position toward a biased position.

2. The component of claim 1 wherein the door comprises a spring configured to bias the door toward the biased position.

3. The component of claim 1 wherein the door comprises a spring, a first arm and a second arm; wherein the spring is configured to move the first arm and the second arm against the base to prevent rotation of the door relative to the base and center the door between walls of the base.

4. The component of claim 3 wherein the door comprises a gear configured to couple the first arm and the second arm; wherein the first arm comprises a first rack and the second arm comprises a second rack; wherein the first rack and the second rack are configured to engage the gear.

5. The component of claim 3 wherein the track comprises a first track and a second track; and wherein the first arm is configured to slide along the first track and the second arm is configured to slide along the second track to guide movement of the door relative to the base.

6. The component of claim 3 wherein the spring is configured to provide a force to at least one of: the first arm to move the door from the offset position toward the biased position; the second arm to move the door from the offset position toward the biased position.

7. The component of claim 1 comprising a mechanism configured to move the door from the open position to the closed position; wherein the mechanism comprises at least one gear and the base comprises at least one rack, wherein the at least one gear is configured to rotate along the at least one rack to move the door relative to the base; wherein the at least one gear is configured to slide along the at least one rack as the door moves between the offset position and the biased position.

8. A component for a vehicle interior comprising:
   a base comprising an opening;
   a track; and
   a door configured (a) to move along the track from an open position to a closed position to cover the opening of the base and (b) to move from the closed position to the open position;
   wherein the door comprises a spring configured to bias the door from a first offset position toward a centered position and from a second offset position toward the centered position.

9. The component of claim 8 wherein the door is configured to move in a direction transverse to the track from the first offset position toward the centered position.

10. The component of claim 8 wherein the door comprises a first arm and a second arm; wherein the spring is configured to move the first arm and the second arm against the base to prevent rotation of the door relative to the base and center the door between walls of the base.

11. The component of claim 10 wherein when the door moves from the centered position toward the first offset position, one of the first arm and the second arm is configured to move relative to the base and the other of the first arm and the second arm is configured to maintain a position relative to the base.

12. The component of claim 10 wherein the door comprises a gear configured to couple the first arm and the second arm; wherein the first arm comprises a first rack and the second arm comprises a second rack; wherein the first rack and the second rack are configured to engage the gear.

13. The component of claim 10 wherein the track comprises a first track and a second track and wherein the first arm is configured to slide along the first track to guide movement of the door relative to the base and the second arm is configured to slide along the second track to guide movement of the door relative to the base.

14. The component of claim 10 wherein the spring is configured to provide a force to at least one of the first arm; the second arm to move the door from the first offset position toward the centered position.

15. The component of claim 8 comprising a mechanism configured to move the door from the open position to the closed position; wherein the mechanism comprises at least one gear and the base comprises at least one rack, wherein the at least one gear is configured to rotate along the at least one rack to move the door relative to the base; wherein the at least one gear is configured to slide along the at least one rack as the door moves between the first offset position, the biased position and the second offset position.

16. A component for a vehicle interior comprising:
   a base comprising an opening;
   a track; and
   a door configured (a) to move in a closing direction from an open position to a closed position to cover the opening of the base and (b) to move from the closed position to the open position;
   wherein the door is configured to move in the closing direction (a) along a first offset path, (b) along a biased path, (c) along a second offset path.

17. The component of claim 16 where the first offset path is generally parallel to the biased path.

18. The component of claim 16 comprising a mechanism configured to move the door from the open position to the closed position along the first offset path, along the biased path and along the second offset path.

19. The component of claim 16 wherein the biased path comprises a centered path; wherein the door is moved toward the centered path by a spring.

20. The component of claim 16 comprising at least one of (a) a console; (b) a floor console; (c) a center console; (d) an instrument panel; (e) a door; (f) a cockpit; (g) a storage compartment.

* * * * *